US012465579B2

(12) United States Patent
Maclean et al.

(10) Patent No.: US 12,465,579 B2
(45) Date of Patent: Nov. 11, 2025

(54) COMPOSITIONS AND METHODS FOR TREATING HOMOCYSTINURIA AND OTHER CONDITIONS

(71) Applicant: THE REGENTS OF THE UNIVERSITY OF COLORADO, A BODY CORPORATE, Denver, CO (US)

(72) Inventors: Kenneth N. Maclean, Lakewood, CO (US); Johan Van Hove, Castle Rock, CO (US); Hua Jiang, Centennial, CO (US); Michael A. Swanson, Denver, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 997 days.

(21) Appl. No.: 17/497,539

(22) Filed: Oct. 8, 2021

(65) Prior Publication Data

US 2022/0096408 A1    Mar. 31, 2022

Related U.S. Application Data

(63) Continuation of application No. PCT/US2020/027721, filed on Apr. 10, 2020.
(Continued)

(51) Int. Cl.
*A61K 31/19* (2006.01)
*A61K 31/145* (2006.01)
(Continued)

(52) U.S. Cl.
CPC ............ *A61K 31/19* (2013.01); *A61K 31/145* (2013.01); *A61K 31/198* (2013.01);
(Continued)

(58) Field of Classification Search
CPC ..................................................... A61K 31/19
See application file for complete search history.

(56) References Cited

U.S. PATENT DOCUMENTS 5,352,440 A    10/1994    Gilchrest et al.
9,895,328 B2   2/2018     Appling et al.
(Continued)

FOREIGN PATENT DOCUMENTS

CA            2257559 A1    12/1997
WO    WO 1989/09258 A1     10/1989
(Continued)

OTHER PUBLICATIONS

Albert et al., "Impaired osteoblast and osteoclast function characterize the osteoporosis of Snyder—Robinson Syndrome" Orphanet Journal of Rare Disease, 10(27): 1-13, 2015.
(Continued)

*Primary Examiner* — Benjamin J Packard
(74) *Attorney, Agent, or Firm* — Polsinelli PC

(57) ABSTRACT

Embodiments of the instant disclosure relate to novel compositions and methods for treating a subject having homocystinuria. In some embodiments, compositions and methods disclosed herein concern improving efficacy of betaine to reduce dietary compliance requirements and improve outcomes. In accordance with these embodiments, a subject having or suspected of developing homocystinuria can be treated with formate, a salt thereof, a formate derivative or formate precursor or prodrug agent alone or in combination with trimethylglycine or other HCU treatments. In other embodiments, a subject having or suspected of developing homocystinuria can be treated with zinc and/or trimethylglycine and/or formate derivative to treat homocystinuria in the subject. In other embodiments, a subject having or suspected of developing Nonketotic hyperglycinemia (NKH) can be treated with formate, a salt thereof, a formate
(Continued)

derivative, or formate precursor or prodrug agent to treat NKH in the subject.

29 Claims, 10 Drawing Sheets

Related U.S. Application Data

(60) Provisional application No. 62/832,036, filed on Apr. 10, 2019.

(51) Int. Cl.
    *A61K 31/198*     (2006.01)
    *A61K 31/205*     (2006.01)
    *A61K 31/4172*     (2006.01)
    *A61K 33/30*     (2006.01)
    *A61K 33/34*     (2006.01)
    *A61P 13/02*     (2006.01)

(52) U.S. Cl.
    CPC ........ *A61K 31/205* (2013.01); *A61K 31/4172* (2013.01); *A61K 33/30* (2013.01); *A61K 33/34* (2013.01); *A61P 13/02* (2018.01)

(56) References Cited

U.S. PATENT DOCUMENTS

| | | | |
|---|---|---|---|
| 2004/0213838 | A1 | 10/2004 | Mazer et al. |
| 2008/0267941 | A1 | 10/2008 | Peters et al. |
| 2010/0028334 | A1 | 2/2010 | Cottarel et al. |
| 2018/0326025 | A1 | 11/2018 | Georgiou et al. |
| 2023/0270708 | A1 | 8/2023 | Maclean et al. |

FOREIGN PATENT DOCUMENTS

| | | | | |
|---|---|---|---|---|
| WO | WO-9609810 | A1 * | 4/1996 | ............. A61K 8/375 |
| WO | WO 2020/210667 | A1 | 10/2020 | |

OTHER PUBLICATIONS

Baldensperger et al., "Comprehensive analysis of posttranslational protein modifications in aging of subcellular compartments" Scientific Reports, 10(7596): 1-11, 2020.

Bonaa et al., "Homocysteine lowering and cardiovascular events after acute myocardial infarction" The New England Journal of Medicine, 354: 1578-1588, 2006.

Bradford, "A rapid and sensitive method for the quantitation of microgram quantities of protein utilizing the principle of protein-dye binding" Analytical Biochemistry, 72: 248-254, 1976.

Burgos-Barragan et al., "Mammals divert endogenous genotoxic formaldehyde into one-carbon metabolism" Nature, 548(7669):549-554, 2017.

Chou et al., "Greater protective potent of s-Methyl Cysteine and Syringic Acid Combination for NGF-differentiated PC12 cells against kainic acid-induced injury" International Journal of Medical Sciences, 16(8): 1180-1187, 2019.

Castro et al., "Liver betaine-homocysteine S-methyltransferase activity undergoes a redox switch at the active site zinc" Archives of Biochemistry and Biophysics, 472(1): 26-33, 2008.

Franceschi et al., "Characterization of macrophage phenotype, redox, and purinergic response upon chronic treatment with methionine and methionine sulfoxide in mice" Amino Acids, 52:629-638, 2020.

Corona de la pena et al., "Inhibition of platelet aggregation by putrescine, spermidine, and spermine in hypercholesterolemic rabbits" Archives of Medical Research, 31:546-550, 2000.

Eisenberg et al., "Cardioprotection and lifespan extension by the natural polyamine spermidine" Nature Medicine, 22(12): 1428-1438, 2016.

Husain et al., "Metabolome analysis revealed increase in S-methylcysteine and phosphatidylisopropanolamine synthesis upon L-cysteine deprivation in the anaerobic protozoan parasite Entamoeba histolytica" The Journal of Biological Chemistry, 285(50):39160-39170, 2010.

Hashizume et al., "Epigenetic regulation of the nuclear-coded GCAT and SHMT2 genes confers human age-associated mitochondrial respiration defects" Scientific Reports, 5:10434, 2015.

Harris et al., "Maternal diet alters exencephaly frequency in SELH/Bc strain mouse embryos" Birth Defects Research Part A, Clinical and Molecular Teratology,73(8): 532-40, 2005.

Iqbal et al., "Folinic acid protects against suppression of growth by methotrexate in mice" Biopharmaceutics & Drug Disposition, 22(4):169-178, 2001.

Imai et al., "Neuroprotective effect of S-allyl-l-cysteine derivatives against endoplasmic reticulum stress-induced cytotoxicity is independent of calpain inhibition" Journal of Pharmacological Sciences, 130: 185-188, 2016.

Jacobs et al., "Cystathionine beta-synthase deficiency alters hepatic phospholipid metabolism: Post-translational repression of phosphatidylethanolamine methyltransferase is a consequence rather than a cause of liver injury in homocystinuria" Molecular genetics and Metabolism, 120: 325-336, 2017.

Wijngaarden et al., "Effect of daily vitamin B-12 and folic acid supplementation on fracture incidence in elderly individuals with an elevated plasma homocysteine concentration: B-Proof, a randomized controlled trial" The American Journal of Clinical Nutrition, 100(6): 1578-1586, 2014.

Jamall et al., "A simple method to determine nanogram levels of 4-hydroxyproline in biological tissues" Analytical Biochemistry, 112:70-75, 1981.

Jamison et al., "Effect of homocysteine lowering on mortality and vascular disease inadvanced chronic kindey disease and end-stage renal disease: a randomized controlled trial" JAMA, 298:1163-70, 2007.

Jiang et al., "Altered hepatic sulfur metabolism in cystathionine beta-synthase deficient homocystinuria: Regulatory role of taurine upon competing cysteine oxidation pathways" FASEB Journal, 28(9):4044-4054, 2014.

Jiang et al., "Sex-specific dysregulation of cysteine oxidation and the methionine andfolate cycles in female cystathionine gamma-lyase null mice: A serendipitous model of the methylfolate trap." Biology Open, 4:1154-1162, 2015.

Jiang et al., "Altered expression of apoA-IV and PON-1 activity in CBS deficient homocystinuria in the presence and absence of treatment: possible implications for cardiovascular outcomes" Molecular Genetics and Metabolism, 107(1-2): 55-65, 2012.

Kalish et al., "A metabolomic analysis of two intravenous lipid emulsions in a murine model" PLoS One, 8(4): e59653, 2013.

Keating et al., "Constitutive induction of pro-inflammatory and chemotactic cytokines in cystathionine beta-synthase deficient homocystinuria" Molecular genetics and Metabolism, 103(4):330-7, 2011.

Lonn et al., "Homocysteine lowering with folic acid and B vitamins in vascular disease" The New England Journal of Medicine, 354: 1567-77, 2006.

Liu et al., "S-Methyl cysteine enhanced survival of nerve growth factor differentiated PC12 cells under hypoxic conditions" Food & Function, 5: 1125-1133, 2014.

Lamers et al., "Glycine turnover and decarboxylation rate quantified in healthy men and women using primed constant infusions of [1,2-(13C2]glycine and [(2)H3]leucine" The Journal of Nutrition, 137(12): 2647-2652, 2007.

Leung et al., "Folate metabolite profiling of different cell types and embryos suggests variation in folate one-carbon metabolism, including developmental changes in human embryonic brain" Molecular and Cellular Biochemistry, 378(1-2): 229-36, 2013.

Heijer et al., "Homocysteine lowering by B vitamins and the secondary prevention of deep vein thrombosis and pulmonary embolism: A randomized, placebo-controlled, double-blind trial" Blood, 109(1): 139-44, 2007.

Maclean et al., "Derangement of hepatic polyamine, folate, and methionine cycle metabolism in cystathionine beta-synthase-

(56) References Cited

OTHER PUBLICATIONS deficient homocystinuria in the presence and absence of treatment: Possible implications for pathogenesis" Molecular Genetics and Metabolism, 132(2):128-138, 2021.
Maclean et al., "Betaine treatment of cystathionine B-synthase deficient homocystinuria; does it work and can it be improved?" Orphan Drugs: Research and Reviews, 2: 23-33, 2012.
Maclean et al., "Taurine treatment prevents derangement of the hepatic gamma-glutamyl cycle and methylglyoxal metabolism in a mouse model of classical homocystinuria: Regulatory cross-talk between thiol and sulfinic acid metabolism" FASEB Journal, 32(3):1265-1280, 2018.
Maclean et al., "Long-term betaine therapy in a murine model of cystathionine beta-synthase deficient homocystinuria: Decreased efficacy over time reveals a significant threshold effect between elevated homocysteine and thrombotic risk" Molecular genetics and Metabolism, 105(3): 395-403, 2012.
Maclean et al., "Taurine alleviates repression of betaine-homocysteine S-methyltransferase and significantly improves the efficacy of long-term betaine treatment in a mouse model of cystathionine B-synthase-deficient homocystinuria" The FASEB Journal, 33(5): 6339-6353, 2019.
Maclean et al., "Cystathionine Beta-Synthase Null Homocystinuric Mice Fail To Exhibit Altered Hemostasis Or Lowering Of Plasma Homocysteine In Response To Betaine Treatment", Molecular Genetics and Metabolism, 101(2-3): 163-171, 2010.
Maclean et al., "High homocysteine and thrombosis without connective tissue disorders are associated with a novel class of cystathionine beta-synthase (CBS) mutations" Human Mutation, 19(6): 641-55, 2002.
Maclean et al., "A Novel Transgenic Mouse Model Of CBS-Deficient Homocystinuria Does Not Incur Hepatic Steatosis Or Fibrosis And Exhibits A Hypercoagulative Phenotype That Is Ameliorated By Betaine Treatment", Molecular Genetics and Metabolism, 101(2-3): 153-162, 2010.
Malouf et al., "Folic acid with or without vitamin B12 for cognition and dementia [Cochrane Review]" Cochrane Database of Systematic Reviews, 4: CD004514, 2004.
Madeo et al., "Nutritional Aspects of Spermidine" Annual Review of Nutrition, 40: 13.1-13.25, 2020.
Mudd et al., "Disorders of Transsulfuration—Chapter 35" The Online Metabolic and Molecular Bases of Inherited Disease McGraw-Hill Education, 1279-1327, 2019.
Mudd et al., "The natural history of homocystinuria due to cystathionine b-synthase deficiency" American Journal of Human Genetics, 37: 1-31, 1985.
Miller et al., "Conformation-dependent inactivation of human betaine-homocysteine S-methyltransferase by hydrogen peroxide in vitro" The Biochemical Journal, 392: 443-448, 2005.
Moreno et al., "Differential neuroprotective effects of 5'-deoxy-5'-methylthioadenosine" PLoS One, 9(3):e90671, 2014.
Naughten et al., "Homocystinuria due to cystathionine beta-synthase deficiency in Ireland: 25 years' experience of a newborn screened and treated population with reference to clinical outcome and biochemical control" Journal of Inherited Metabolic Disease, 21(7): 738-747, 1998.
Pakala, "Inhibition of arterial thrombosis by polyamines in a canine coronary artery injury model" Thrombosis Research, 110: 47-51, 2003.
Pakala, "Effect of polyamines on in vitro platelet aggregation and in vivo thrombus formation" Cardiovascular Radiation Medicine, 3: 213-220, 2002.
Pontel et al., "Endogenous Formaldehyde is a Hematopoietic Stem Cell Genotoxin and Metabolic Carcinogen" Molecular Cell, 60(1): 177-88, 2015.

Rosenblatt et al., Inherited disorders of folate and cobalamin transport and metabolism, in: B.A. Seriver CR, Sly WS, Valle D (Ed.), The metabolic and molecular bases of inherited disease McGraw-Hill Professional, New York, 2001, pp. 3897-3933.
Rosenblatt, "Chapter 9 Inherited Disorders of folate and cobalamin" Graham et al., (eds.) Homocysteine Metabolism: From Basic Science to Clinical Medicine, 61-68, 1997.
Soares et al., "High levels of methionine and methionine sulfoxide: Impact on adenine nucleotide hydrolysis and redox status in platelets and serum of young rats" Journal of Cellular Biochemistry, 1-15, 2018.
Tang et al., "5'-Methylthioadenosine attenuates ischemia reperfusion injury after liver transplantation in rats" Inflammation, 37:1366-1373, 2014.
Tani et al., "Mice deficient in the Shmt2 gene have mitochondrial respiration defects and are embryonic lethal" Scientific Reports, 8:425, 2018.
Green et al., "Lowering homocysteine with B vitamins has no effect on biomarkers of bone turnover in older persons: a 2-y randomized controlled trial" American Journal of Clinical Nutrition, 85(2): 460-4, 2007.
Toole et al., "Lowering homocysteine in patients with ischemic stroke to prevent recurrent stroke, myocardial infarction, and death: the Vitamin Intervention for Stroke Prevention (VISP) randomized controlled trial" JAMA, 291:565-75, 2004.
Tibbetts et al., "Compartmentalization of Mammalian folate-mediated one-carbon metabolism" Annual Review of Nutrition. 2010, vol. 30: 57-81.
Rebeille et al., "Methionine catabolismin *Arabidopsis* cells is initiated by a gamma-cleavage process and leads to S-methylcysteine and isoleucine syntheses" PNAS, 103(42): 15687-15692, 2006.
Oliai et al., "Long-term effects of folic acid and vitamin-B12 supplementation on fracture risk and cardiovascular disease: Extended follow-up of the B-PROOF trial" Clinical Nutrition, 40: 1199-1206, 2021.
Van Hove et al., "Biomarkers of oxidative stress, inflammation and vascular dysfunction in inherited cystathionine beta-synthase deficient homocystinuria and the impact of taurine treatment in a phase 1/2 human clinical trial" Journal of Inherited Metabolic Disease, 42: 424-437, 2019.
Pascale et al., "Chemoprevention of hepatocarcinogenesis: S-adenosyl-L-methionine" Alcohol, 27:193-198, 2002.
Yap et al., "Vascular outcome in patients with homocystinuria due to cystathionine beta-synthase deficiency treated chronically; a multicenter observational study" Arteriosclerosis, Thrombosis, and Vascular Biology, 21(12):2080-2085, 2001.
Maclean et al., "Cystathionine protects against endoplasmic reticulum Stress-induced Lipid Accumulation, Tissue Injury, and Apoptotic Cell Death" The Journal of Biological Chemistry,287(38): 31994-32005, 2012.
Kumar et al., "Homocystinuria: Therapeutic approach," Clinica Chimica Acta 458 (2016) 55-62.
Anonymous, "The role of prebiotics in the management of inflammatory bowel diseases," Interview with Dr. Francisco Guarner, An ORAFTI Newsletter, No. 10—Summer 2004, 16 pages.
MacLean et al., "Manipulating folate metabolism achieves near-normal homocysteine without methionine restriction in homocystinuric mice," Abstract, Journal of Inherited Metabolic Disease, vol. 42, No. s!, Aug. 25, 2019, pp. 13-14.
Pai et al., "Glycine decarboxylase deficiency causes neural tube defects and features of non-ketotic hyperglycinemia in mice", Nature Communications, Mar. 2015, vol. 6, No. 6388, pp. 1-11.
Pakfetrat, M. et al., "Effects of Zinc Supplement on Plasma Homocysteine Level in End-Stage Renal Disease Patients: a Double-Blind Randomized Clinical Trial," Biological Trace Element, vol. 153, No. 1, Mar. 12, 2013, pp. 11-15.

* cited by examiner

A.

B.

A.

B.

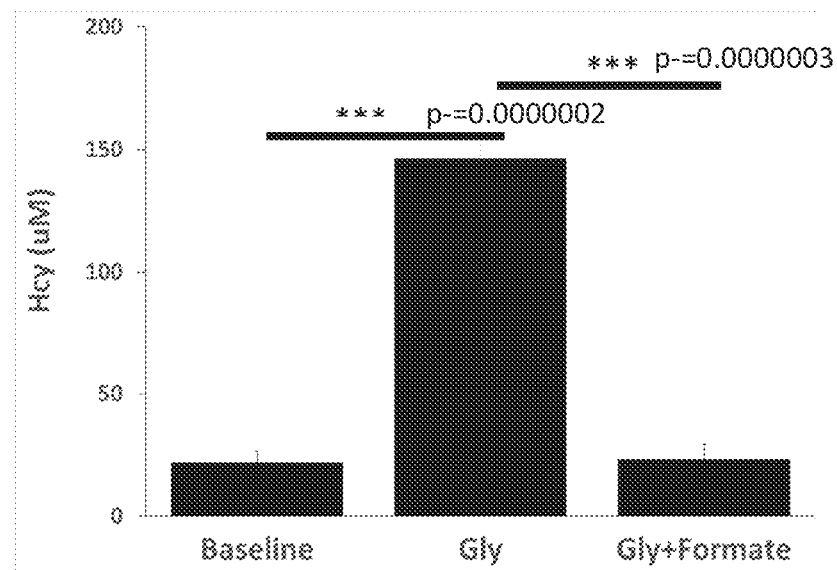
Fig. 16
A. WT
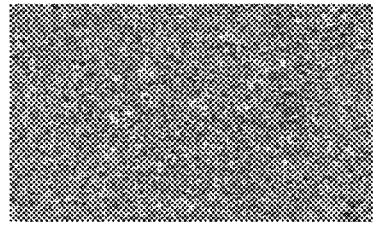
B. Cbs null (-/-)
C. HO
Figs. 17A-17C ized by a range of connective tissue disturbances, mental

COMPOSITIONS AND METHODS FOR TREATING HOMOCYSTINURIA AND OTHER CONDITIONS

PRIORITY TO RELATED APPLICATIONS

This U.S. Continuation Application claims priority to Patent Cooperation Treaty (PCT) Application No. PCT/US2020/027721, filed Apr. 10, 2020, which PCT application claims priority to U.S. Provisional Application No. 62/832,036 filed Apr. 10, 2019. These applications are hereby incorporated by reference in their entirety for all purposes.

FIELD OF THE INVENTION

Embodiments of the instant disclosure relate to novel compositions and methods for treating a subject with a genetic homocystinuria. In some embodiments, compositions and methods disclosed herein concern improving efficacy of standard treatments (e.g. trimethylglycine) to reduce dietary compliance requirements and improve outcomes. In accordance with these embodiments, a subject having or suspected of developing homocystinuria can be treated with formate, a salt thereof, formate derivative, or formate precursor or prodrug agent alone or in combination with trimethylglycine (e.g. betaine) or other homocystinuria treatment. In other embodiments, a subject having or suspected of developing homocystinuria can be treated with zinc and/or trimethylglycine or other standard treatment and/or formate, a salt thereof, formate derivative or formate precursor or prodrug agent to treat homocystinuria in the subject. In other embodiments, a subject having or suspected of developing Nonketotic hyperglycinemia (NKH) can be treated with formate, a salt thereof, a formate derivative or formate precursor or prodrug agent alone or in combination with other treatments to reduce homocysteine levels in the subject and treat NKH.

BACKGROUND OF THE INVENTION

Homocystinuria is a disorder in which the body is unable to process certain amino acids and homocysteine accumulates. Other forms of homocystinurias exist. Genetic homocystinurias can be due to either deficiency of cystathionine beta-synthase (HCU), methylenetetrahydrofolate reductase (MTHFR), inactivating mutations in methionine synthase or defects in the metabolism/transport of the methionine synthase co-factor cobalamin. HCU is an autosomal recessive disorder of sulfur amino acid metabolism such as methionine and is commonly caused by a deficiency in cystathionine β-synthase (CBS). This enzyme sits at the branch point between the methionine cycle and transsulfuration and catalyzes the condensation of serine and homocysteine (Hcy) into cystathionine which is subsequently converted to cysteine by cystathionine-lyase (CGL). Homocystinurias lead to a multi-systemic disorder of the connective tissue, muscles, central nervous system (CNS), and cardiovascular system. In human patients, HCU, for example, is characterretardation and a dramatically increased incidence of vascular disorders particularly thromboembolic disease. One major cause of death in HCU patients is cardiovascular complications. It is estimated that untreated patient with the severest form of this disease have about a 27% chance of having a thrombotic event by the age of 15. Hereditary metabolic disorders are caused by accumulation of homocysteine in serum and an increased excretion of homocysteine in the urine. Typical treatment for severe CBS deficient HCU involves lowering homocysteine (Hcy) levels by a combination of restricting dietary intake of methionine with a protein-restricted diet and remethylating Hcy with betaine treatment. While this regimen is effective, compliance with a methionine-restricted diet is extremely difficult and typically poor. In addition, efficacy of betaine treatment for lowering plasma and tissue levels of Hcy significantly diminishes over time. Therefore, other more effective treatments with a reduced need for compliance and improved efficacy for HCU are needed.

Nonketotic hyperglycinemia (NKH) is a rare autosomal recessively inherited glycine encephalopathy caused by a deficiency in the mitochondrial glycine cleavage system, which leads to severe clinical symptoms. NKH is characterized by complex and diverse phenotypes, such as hypotonia, seizures, cognitive impairment, developmental delays and myoclonic jerks that may lead to apnea and death. For the severest forms of this condition, there is currently no effective treatment. Therefore, effective treatments for NKH are needed.

SUMMARY OF THE INVENTION

Embodiments of the instant disclosure relate to novel compositions, methods and uses for treating a subject having homocystinuria to improve clinical outcomes. In some embodiments, compositions and methods disclosed herein concern improving efficacy of existing treatments. In accordance with this embodiment, compositions disclosed herein can be combined with standard treatments of homocystinurias in order to improve outcomes. In certain embodiments, compositions disclosed herein can be used to treat homocystinuria (e.g. HCU) and reduce dietary compliance requirements for improved outcomes of the condition in the subject. In some embodiments, compositions including formate, a salt thereof, a formate derivative or formate precursor or prodrug agent can be administered alone or in combination with trimethylglycine (e.g. betaine) to treat a subject having homocystinuria.

In certain embodiments, compositions disclosed herein can be administered to a subject having homocystinuria and/or NKH. In accordance with these embodiments, compositions to treat homocystinuria and/or NKH can include an effective amount of a formate derivative or formate precursor or prodrug agent to lower homocysteine (Hcy) levels in a subject. In certain embodiments, a formate derivative or other agent can include a formate prodrug esterified to glycerol, for example, diformylglycerol, triformylglycerol (e.g. triformin) in an oil form, or other suitable form or combined with one or more excipients to improve bioavailability of formate or formate derivative. Alternatively, a formate derivative or prodrug contemplated herein can include a diformylglycerol-glucose conjugate or diformylglycerophosphocholine, diformylglycerophosphoethanolamine, or as a mixed glycerol ester, or other suitable form or combined with one or more excipients to improve bioavailability. In certain embodiments, compositions disclosed herein can include administering pectin known to produce formate by intestinal fermentation in the microbiome, for example administering at mealtime or in a gradual release form over several minutes, hours or more. In other embodiments, a subject can be treated with a microorganism (e.g. a probiotic bacteria or other organism capable of producing formate or formate derivative). In certain embodiments, the concentration of formate or formate derivative contemplated herein can be administered to a subject at about 0.5 mg/kg to about 100.0 mg/kg; or about 2.0 mg/kg to about 80 mg/kg; or about 3.0 mg/kg to about 70 mg/kg: or 4.0 mg/kg to about 60 mg/kg; or 5.0 mg/kg to about 50 mg/kg, 2-4 times per day, daily, every other day, weekly, or other suitable dosing regimen.

In some embodiments, compositions disclosed herein can be administered to a subject having homocystinuria and/or NKH. In accordance with these embodiments, compositions to treat homocystinuria and/or NKH can include an effective amount of formate, a salt thereof (e.g. sodium formate), a formate derivative or formate precursor or prodrug agent to lower homocysteine (Hcy) levels in a subject. In certain embodiments, compositions disclosed herein can include administering pectin known to produce formate by intestinal fermentation in the microbiome, for example administering at mealtime or in a gradual release form over several minutes, hours or more. In other embodiments, a subject can be treated with a microorganism (e.g. a probiotic bacteria or other organism capable of producing formate or formate derivative). It is known that formate can induce the expression of formaldehyde detoxifying enzyme ADH5 (AKA GSNOR). In other embodiments, administration of formate or a formate derivative as disclosed herein to a subject having homocystinuria or NKH can be combined with at least one of taurine and n-acetylcysteine, or other equivalent in order to boost glutathione availability for formaldehyde detoxification for a more effective treatment with reduced side effects. In accordance with these embodiments, taurine concentration can be about 10 mg/kg to about 300 mgs/kg; or about 20 mg/kg to about 250 mgs/kg; or about 30 mg/kg to about 200 mgs/kg; or about 50 mg/kg to about 150 mgs/kg provided daily, two or more times per day, every other day or other appropriate dosing regimen separate from or in the same compositions as the other agents. In other embodiments, N-acetylcysteine concentration can be about 20 mg/kg to about 300 mgs/kg; or about 30 mg/kg to about 250 mgs/kg; or about 40 mg/kg to about 200 mgs/kg; or about 100 mg/kg to about 180 mgs/kg provided daily, two or more times per day, every other day or other appropriate dosing regimen separate from or in the same compositions as the other agents. In other embodiments, pectin concentration can be about 2.0 g to about 50 g; or about 3.0 g to about 40 g; or about 4.0 g to about 30 g; or about 6.0 g to about 20 g; or about 7.5 g to about 15 g provided daily, two or more times per day, every other day or other appropriate dosing regimen separate from or in the same compositions as the other agents. In some embodiments, these agents can be administered at the same time in a single composition, simultaneously as separate agents or sequentially administered depending on the condition and the subject to be treated. In some embodiments, standard treatments for homocystinurias are combined with these compositions (e.g. betaine).

In certain embodiments, zinc or a zinc conjugate or other acceptable zinc delivery agent administered as a combination with a formate, formate derivative, formate prodrug and/or pectin to a subject having NKH and the concentration can be about 1.0 mgs to about 150 mgs; or about 2.0 mgs to about 100 mgs; or about 3.0 mgs to about 80 mgs; or about 4.0 mgs to about 70 mgs; or about 5.0 mgs to about 60 mgs; or about 35 mg to 60 mgs for an adult or about 2 mgs to about 10 mgs for an infant or about 15 mgs to about 35 mgs for a child or adolescent 2-4 times per day, daily, every other day, weekly, or other suitable dosing regimen. In yet other embodiments, a formate or formate derivative as indicated herein can be delivered to the subject before, at the time of or after administering zinc or zinc conjugate (and optionally, copper or copper-containing agent). In some embodiments, a formate or formate derivative in combination with administering zinc or zinc conjugate as disclosed herein (e.g. at the same or different time) can be combined with any standard NKH treatment.

In other embodiments, an effective amount of formate, a salt thereof (e.g. sodium formate), a formate derivative or formate precursor or prodrug agent to lower homocysteine (Hcy) levels in a subject having homocystinuria noted above can be combined with standard treatments, for example administered before, after or at the time of administering trimethylglycine (e.g. betaine) where trimethylglycine can be administered to a subject at standard concentrations. In accordance with these embodiments, trimethylglycine (e.g. betaine) can be administered or taken at about 10 mg/kg to about 200 mg/kg; or about 20 mg/kg to about 150 mg/kg; or 30 mg/kg to about 100 mg/kg; or 40 mg/kg to about 80 mg/kg; or about 50 mg/kg 2-4 times per day, daily, every other day, weekly, or other suitable dosing regimen to the subject. In accordance with these embodiments, trimethylglycine can be administered in doses of about 20 mg/kg to about 200 mg/kg or about 50 mg/kg to about 150 mg/kg as a single administration dosage or multiple administrations to a subject having HCU or at mealtime where the dose is tailored to the number of times taken per day to about 1.0 gram to about a 40.0 grams or about 5.0 grams to about 30 grams or about 6.0 grams to about 20 grams total per subject per day. In certain compositions disclosed herein, an effective amount of trimethylglycine (e.g. betaine) in a composition separate from or in combination with a formate or formate agent disclosed herein can be about 1 to about 3% w/v or about 2% w/v concentration of trimethylglycine (e.g. betaine) in solution (e.g. water or other acceptable medium or excipient).

In certain embodiments, compositions disclosed herein can be administered to a subject having homocystinuria (e.g. HCU). In accordance with these embodiments, compositions to treat homocystinuria (e.g. HCU) can include an effective amount of zinc to lower homocysteine (Hcy) levels in a subject. In certain embodiments, zinc or a zinc conjugate or other acceptable zinc delivery agent can be administered to a subject can be about 1.0 mgs to about 150 mgs daily or every other day or other appropriate dosing regimen; or about 2.0 mgs to about 100 mgs daily or every other day; or about 3.0 mgs to about 80 mgs daily or every other day; or about 4.0 mgs to about 70 mgs daily or every other day; or about 5.0 mgs to about 60 mgs daily or every other day; or about 35 mg to 60 mgs per day for an adult or about 2 mgs to about 10 mgs for an infant or about 15 mgs to about 35 mgs for a child or adolescent.

In other embodiments, an effective amount of zinc or a zinc conjugate or other acceptable zinc delivery agent to lower homocysteine (Hcy) levels can be combined with standard treatments, for example administered before, after or at the time of administering (e.g. simultaneously) trimethylglycine (e.g. betaine) where trimethylglycine can be administered to a subject at standard concentrations. In accordance with these embodiments, trimethylglycine (e.g. betaine) can be administered or taken at about 10 mg/kg to about 200 mg/kg; or about 20 mg/kg to about 150 mg/kg; or 30 mg/kg to about 100 mg/kg; or 40 mg/kg to about 80 mg/kg; or about 50 mg/kg 2-4 times per day, daily, every other day, weekly, or other suitable administration schedule to the subject. In accordance with these embodiments, trimethylglycine can be administered in doses of about 20 mg/kg to about 200 mg/kg or about 50 mg/kg to about 150 mg/kg as a single administration or multiple administrations to a subject having homocystinuria (e.g. HCU) or at mealtime where the dose is tailored to the number of times taken per day to about 1.0 gram to about a 40.0 gram total per subject daily. In certain compositions disclosed herein, an effective amount of trimethylglycine (e.g. betaine) in a composition separate from or in combination with one or more zinc-conjugates or zinc agents disclosed herein with about 1.0% to about 3% w/v or about 2% w/v concentration of trimethylglycine (e.g. betaine) in solution (e.g. water or other acceptable medium or excipient). In other embodiments, zinc can be combined with standard treatments as well as glycine, serine, histidine or methylglycine or other suitable amino acid to reduce homocysteine levels and treat homocystinuria in the subject.

In some embodiments, compositions to treat HCU can include an effective amount of formate, a salt thereof (e.g. sodium formate), a formate derivative or formate precursor or prodrug agent, pectin or a recombinant bacteria capable of producing formate in combination with zinc or a zinc containing agent to lower homocysteine (Hcy) levels in a subject. In accordance with these embodiments, compositions to treat aberrant Hcy levels can include an effective amount of formate, a salt thereof (e.g. sodium formate), a formate derivative or formate precursor or prodrug agent to lower homocysteine (Hcy) levels in a subject. In certain embodiments, a formate derivative or other agent can include a formate prodrug esterified to glycerol, for example, diformylglycerol, triformylglycerol (e.g. triformin) in an oil form, or other suitable form or combined with one or more excipients to improve bioavailability of formate or formate derivative. Alternatively, a formate derivative or prodrug contemplated herein can include a diformylglycerol-glucose conjugate or diformylglycerophosphocholine, diformylglycerophosphoethanolamine, or as a mixed glycerol ester, or other suitable form or combined with one or more excipients to improve bioavailability. In some embodiments, the concentration of formate or formate derivative administered to a subject in combination with zinc can be about 0.5 mg/kg to about 100.0 mg/kg; or about 2.0 mg/kg to about 80 mg/kg; or about 3.0 mg/kg to about 70 mg/kg: or 4.0 mg/kg to about 60 mg/kg; or 5.0 mg/kg to about 50 mg/kg, 2-4 times per day, daily, every other day, weekly, or other suitable administration schedule. In certain embodiments, zinc or a zinc conjugate or other acceptable zinc delivery agent administered as a combination with a formate above to a subject can be about 1.0 mgs to about 150 mgs; or about 2.0 mgs to about 100 mgs; or about 3.0 mgs to about 80 mgs; or about 4.0 mgs to about 70 mgs; or about 5.0 mgs to about 60 mgs; or about 35 mg to 60 mgs for an adult or about 2 mgs to about 10 mgs for an infant or about 15 mgs to about 35 mgs for a child or adolescent 2-4 times per day, daily, every other day, weekly, or other suitable dosing regimen. In yet other embodiments, a formate or formate derivative as indicated herein can be delivered to the subject before, at the time of or after administering zinc or zinc conjugate. In some embodiments, a formate or formate derivative in combination with administering zinc or zinc conjugate as disclosed herein (e.g. at the same or different time) can be combined with any standard treatment; for example, trimethylglycine (e.g. betaine) where trimethylglycine can be administered to a subject at standard concentrations as noted above at the time of administering formate and zinc compositions such as during one or more meal.

In other embodiments, compositions contemplated herein can include a pharmaceutically acceptable formulations of formate, a salt thereof (e.g. sodium formate), a formate derivative or formate precursor or prodrug agent for administration to a subject. In certain embodiments, compositions can include zinc or a zinc conjugate (and optionally a copper supplement) or other acceptable zinc delivery agent alone or in combination with formate or formate prodrug disclosed herein. In yet other embodiments, compositions contemplated herein can include formate and/or zinc (and optionally, copper) and/or a standard treatment for HCU such as trimethylglycine (e.g. betaine). In certain embodiments, a zinc-containing composition can be combined with a standard treatment for homocystinuria, (e.g. HCU) such as trimethylglycine (e.g. betaine, such as an anhydrous betaine, betaine hydrochloride). Modes of administration for these compositions can include any mode suitable for delivery of such agents such as oral administration (e.g. by tablet, liquid or hydratable powder), intravenously, intra-rectally, or subcutaneously administered or other mode of administration.

In some embodiments, compositions or formulations disclosed herein can be administered in powder form, tablet, by microparticle, in a slow or time-release microparticle or other suitable format or other known time-delivery method or in an aqueous solution. In certain embodiments, an effective amount of a composition or formulation can be administered for homocystinuria management (e.g., for a subject's lifetime). In some embodiments, the compositions or formulations disclosed herein can include tetrahydrofolate donor compounds and can further facilitate remethylation of Hcy in a subject having homocystinuria.

In other aspects of the present invention, methods disclosed herein include treating a subject having homocystinuria or NKH. In accordance with the embodiments, methods can include identifying a subject in need of lowering Hcy levels or having been diagnosed with homocystinuria or NKH and administering an effective amount of a composition comprising formate or a formate derivative disclosed herein to the subject and lowering Hcy in the subject. In some embodiments, a formate or a formate derivative can be administered at mealtime to the subject alone or in combination with standard treatments for lowering Hcy; and/or in combination with zinc or zinc-containing agent and/or a copper supplement. In certain aspects of the invention, compositions disclosed herein for treating a subject having aberrant levels of Hcy can reduce or eliminate the need for monitoring the diet of the subject depending on the subject being treated and level of Hcy in the subject or other factors. In certain aspects of the invention, formate or a formate derivative and/or pectin and/or zinc or zinc-containing agent and/or taurine and/or N-acetylcysteine and/or glycine, serine, histidine or methylglycine is capable of prolonging the effects of, or reducing the tolerance of standard Hcy management regimens (e.g. betaine administration) or replacing standard Hcy management regimens.

Some embodiments disclosed herein concern kits that can include compositions disclosed herein for treating Hcy overproduction in a subject or treating NKH. In certain embodiments, kits can include capsules, microparticles, liquid compositions or tablet forms of the compositions for ready administration or consumption by the subject for treating the disorder.

BRIEF DESCRIPTION OF THE DRAWINGS

FIG. 16 represents a histogram plot of level of homocysteine levels (Hcy) untreated (HO), treated as a negative control (e.g. glycine) and treated with a negative control plus a novel treatment (e.g. formate) in a knock-out mouse model (e.g. GLDC mutation A394V mouse model) representing NKH (nonketotic hyperglycinemia) in certain embodiments disclosed herein.

FIGS. 17A-17C represent exemplary images of WT (A), Cbs null (−/−:BHMT mouse model knock out) (B) and HO (C) of liver samples obtained demonstrating level of tissue damage and demonstrating that treatment response observed herein is at least BHMT dependent.

DEFINITIONS

Figure 1:
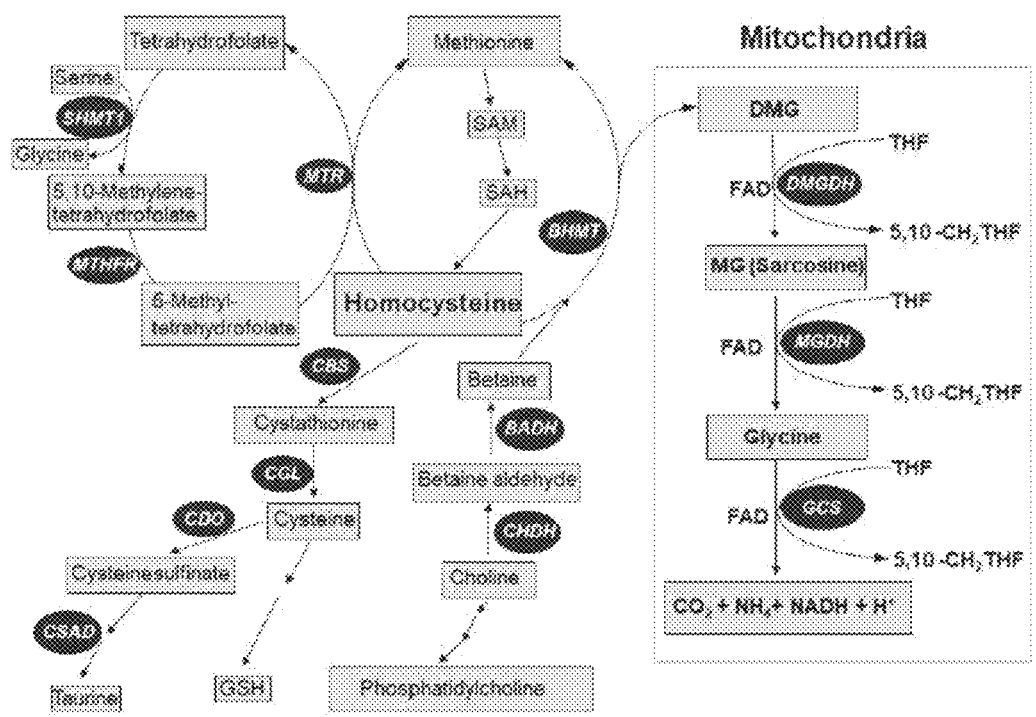
FIG. 1 is a schematic diagram representing methionine and cysteine and choline metabolism in mammals in certain embodiments disclosed herein.

Terms, unless specifically defined herein, have meanings as commonly understood by a person of ordinary skill in the art relevant to certain embodiments disclosed herein or as applicable.

Unless otherwise indicated, all numbers expressing quantities of agents and/or compounds, properties such as molecular weights, reaction conditions, and as disclosed herein are contemplated as being modified in all instances by the term "about." Accordingly, unless indicated to the contrary, the numerical parameters in the specification and claims are approximations that may vary by about 10 to about 15% plus and/or minus depending upon the desired properties sought as disclosed herein. Numerical values as represented herein inherently contain standard deviations that necessarily result from the errors found in the numerical value's testing measurements.

As used herein, "Homocysteine" or "Hcy" can refer to a sulfur-containing amino acid that is closely related to or a precursor of methionine and cysteine. There is no DNA-coding for Hcy, and it is not present in naturally occurring proteins. All Hcy found in organisms is formed in the performance of generating the amino acid, methionine, in the methylation cycle. As used herein, "tHcy" can refer to total homocysteine.

As used herein, "One carbon metabolism" or "OCM" can refer to metabolism mediated by a folate cofactor that supports multiple physiological processes. These include biosynthesis (purines and thymidine), amino acid homeostasis (glycine, serine, and methionine), epigenetic maintenance, and redox defense. Reduced tetrahydrofolates (THFs) can serve as a family of enzyme cofactors that chemically activate and carry one carbon units on the N5 and/or the N10 of THF at the oxidation level of formate (e.g., 10-formylTHF), formaldehyde (e.g., 5,10-methyleneTHF), or methanol (e.g., 5-methylTHF). Folate derivatives also contain a covalently bound polyglutamate peptide of varying length. Serum folates contain a single glutamate residue, whereas intracellular folates contain a polyglutamate peptide usually consisting of five to eight glutamate residues that are polymerized through unusual γ-linked peptide bonds. OCM is compartmentalized within the cell with separate pools in the nucleus, cytoplasm and mitochondria as previously disclosed.

As used herein, "Formate" or "Formate prodrug" or "Formate precursor" or "Formate-like agent" can refer to formic acid or an agent capable of producing formic acid or format upon introduction to a subject as disclosed in certain embodiments disclosed herein. For example, a format derivative can include, but is not limited to, diformylglycerol, triformylglycerol (e.g. triformin) in an oil form, or other suitable form or combined with one or more excipients to improve bioavailability of formate or formate derivative. Alternatively, a formate derivative or prodrug contemplated herein can include a diformylglycerol-glucose conjugate or diformylglycerophosphocholine, diformylglycerophosphoethanolamine, or as a mixed glycerol ester, or other suitable form or combined with one or more excipients to improve bioavailability of formate or a formate derivative to a subject. Formate is typically found in biological systems in an anion form; is the only non-THF-linked intermediate in OCM and is produced in mammals from a variety of metabolic sources. Formate typically represents 10%-30% of the total volatile fatty acids in the blood of many mammals including humans and is an essential intermediary metabolite in folate-mediated OCM. Knowledge of its metabolism is currently limited. One principle role of formate is that it is a source of single-carbon groups for the synthesis of 10-formyl-THF and other single-carbon intermediates. These are primarily used for purine synthesis, thymidylate synthesis, and the provision of methyl groups for synthetic, regulatory, and epigenetic methylation reactions. Formate is produced in mitochondria via the catabolism of serine, glycine, dimethylglycine (DMG), and MG (sarcosine). Formate produced by mitochondria can be incorporated into the cytosolic folate pool of use for important biosynthetic reactions. As disclosed herein compositions and methods can be formic acid (methanoic acid), a salt thereof (e.g. sodium formate), a formate derivative or formate precursor or prodrug agent. In certain embodiments, a formate derivative or other agent can include a formate prodrug esterified to glycerol, for example, triformyl glycerol (e.g. triformin) in an oil form or other suitable form or combined with one or more excipients to improve bioavailability or a pharmaceutically acceptable salt or ester thereof.

As used herein, "reduce," "inhibit." "diminish," "suppress," "decrease," "prevent" and grammatical equivalents (including "lower," "smaller." etc.) when in reference to expression of any symptom or level of any agent in an untreated subject having a condition relative to a treated subject having the same condition, can refer to quantity of an assessed agent and/or magnitude of a symptom or side-effect in the treated subject. In certain embodiments quantity of an assessed agent and/or magnitude of a symptom or side-effect in the treated subject is reduced or lowered when compared to the untreated subject by any amount that is recognized as clinically relevant by one of skill in the art or a health professional. In one embodiment, the quantity and/or magnitude of the agent and or symptom(s) in the treated subject is about 5%, or about 10%, or about 15%, or about 20%, or about 25%, or about 30%, or about 35%, or about 40%, or about 45% or about 50% lower or higher than the quantity and/or magnitude of the agent and or symptom(s) in the untreated subject.

As used herein. "administered" or "administering" and the like can refer to any method of providing a composition and/or formulation to a subject.

As used herein, "treatment", "treating" and the like can refer to obtaining a desired pharmacologic and/or physiologic effect. For example, effects can be prophylactic in terms of completely, or partially preventing a condition or symptom thereof.

As used herein, "individual", "subject", "host", and "patient" are used interchangeably herein and refer to any mammalian subject for whom diagnosis, treatment, or therapy is desired, particularly humans.

As used herein, "effective amount" as used herein, can refer to a particular amount of a pharmaceutical composition including a therapeutic agent that achieves a clinically beneficial result (e.g., for example, a reduction of symptoms or side effects of the condition).

As used herein, the term "concurrently" as used herein can refer to administration of two or more therapeutic agents, where at least part of the administration overlaps in time. Accordingly, concurrent administration includes a dosing regimen when the administration of one or more agent(s) continues after discontinuing the administration of one or more other agent(s). In certain embodiments, a composition and/or formulation disclosed herein can be administered concurrently with a standard or known composition of the present invention.

DETAILED DESCRIPTION OF THE INVENTION

In the following sections, various exemplary compositions and methods are described in order to detail various embodiments of the invention. It will be obvious to one skilled in the art that practicing the various embodiments does not require the employment of all or even some of the specific details outlined herein, but rather that concentrations, times and other specific details may be modified through routine experimentation. In some cases, well known methods, or components have not been included in the description.

In certain embodiments, the instant disclosure relates, in part, to improved compositions for treating homocystinuria (e.g. HCU) in a subject. In some embodiments, improved compositions are contemplated to be combined with standard treatments in order to provide life-altering solutions to subjects having homocystinurias. In some embodiments, compositions and/or formulations disclosed herein can reduce symptoms or signs of this Hcy aberrant condition. In other embodiments, compositions and/or formulations disclosed herein can improve life-style, reduce symptoms, and/or reduce morbidity in a subject having a Hcy aberrant condition contemplated herein.

In other embodiments, the instant disclosure relates, in part, to compositions or formulations for treating Nonketotic hyperglycinemia (NKH) in a subject. In some embodiments, compositions are contemplated to provide life-altering solutions to subjects having NKH with no available treatment. In some embodiments, compositions and/or formulations disclosed herein can reduce symptoms or signs of this Hcy aberrant condition. In other embodiments, compositions and/or formulations disclosed herein can reduce morbidity in a subject having NKH.

Embodiments of the instant disclosure relate to novel compositions, methods and uses for treating a subject having homocystinuria (e.g. HCU) to improve clinical outcomes. In some embodiments, compositions and methods disclosed herein concern improving efficacy of existing treatments. In accordance with this embodiment, compositions disclosed herein can be combined with standard treatments of homocystinuria in order to improve outcomes. In certain embodiments disclosed herein, compositions can be used to treat aberrant homocysteine levels and reduce dietary compliance requirements for improved outcomes of the condition in the subject and improved life-style with reduced concerns. In some embodiments, compositions including formate, a salt thereof, a formate derivative or formate precursor or prodrug agent or pectin or bacteria capable of producing formate can be administered alone or in combination with trimethylglycine (e.g. betaine) to treat homocystinuria.

HCU

Classical homocystinuria (HCU) is caused by deficiency of cystathionine β-synthase (CBS). The CBS enzyme sits at the branch point between the methionine cycle and trans-sulfuration and catalyzes the condensation of serine and Hcy into cystathionine which is subsequently converted to cysteine by cystathionine γ-lyase (CGL), as illustrated in FIG. 1. HCU is characterized clinically by cognitive impairment with pronounced deficits in memory and learning, psychopathic behavior, seizures, connective tissue disturbances, and cardiovascular disease. Biochemically, HCU induces severe plasma/tissue elevations of Hcy, methionine, S-adenosylmethionine (SAM), S-adenosylhomocysteine (SAH), and abolition of cystathionine synthesis and decreased cysteine and glutathione levels. Cardiovascular complications are the major cause of morbidity in HCU and are also common to other genetic homocystinuria caused by impaired MTHFR or MTR function.

Standard Treatment of HCU

It is known in the art that treatment strategies for HCU and more specifically for pyridoxine non-responsive HCU by health professionals attempts to lower plasma and tissue levels of Hcy in an affected subject using a combination of restricting dietary intake of Hcy precursors such as methionine and further dietary supplementation with trimethylglycine, more commonly referred to as betaine. Betaine (N,N,N-trimethylglycine) is a zwitterionic quaternary ammonium compound that is also known as oxyneurin, glycine-betaine, or trimethylglycine. Trimethylglycine serves as a methyl donor in the remethylation of Hcy to methionine in a reaction occurring almost exclusively in the liver and catalyzed by betaine-homocysteine S-methyltransferase (BHMT). Early intervention with this treatment can prevent or ameliorate the clinical signs of HCU resulting in significantly improved survival and clinical outcome. However, compliance with a methionine-restricted diet is extremely difficult and often patients fail to adhere to such strict dietary constraints often with detrimental consequences. Betaine is also used to lower plasma and tissue levels of homocysteine in the treatment of the other genetic homocystinuria caused by impaired MTHFR or MTR function.

The efficacy of betaine treatment in HCU diminishes significantly over time. If the efficacy of betaine treatment could be increased, it is conceivable that strict adherence to the methionine-restricted diet could be relaxed thus constituting a significant improvement in both outcome and quality of life for individuals with HCU. Improving understanding of folate metabolism in HCU can lead to improving betaine treatment in all forms of homocystinuria with a view towards reducing dependence upon methionine-restriction and improving clinical outcome.

In certain embodiments, compositions disclosed herein can be administered to a subject having homocystinuria and/or NKH. In accordance with these embodiments, compositions can include an effective amount of formate, a salt thereof (e.g. sodium formate), a formate derivative or formate precursor or prodrug agent to lower homocysteine (Hcy) levels in a subject. In certain embodiments, a formate derivative or other agent can include a formate prodrug esterified to glycerol, for example, diformylglycerol, triformylglycerol (e.g. triformin) in an oil form, or other suitable form or combined with one or more excipients to improve bioavailability of formate or formate derivative. Alternatively, a formate derivative or prodrug contemplated herein can include a diformylglycerol-glucose conjugate or diformylglycerophosphocholine, diformylglycerophosphoethanolamine, or as a mixed glycerol ester, or other suitable form or combined with one or more excipients to improve bioavailability. In certain embodiments, the concentration of formate or formate derivative contemplated herein can be administered to a subject at about 0.5 mg/kg to about 100.0 mg/kg; or about 2.0 mg/kg to about 80 mg/kg; or about 3.0 mg/kg to about 70 mg/kg: or 4.0 mg/kg to about 60 mg/kg; or 5.0 mg/kg to about 50 mg/kg, 2-4 times per day, daily, every other day, weekly, or other suitable administration schedule.

One carbon metabolism is critical for mammalian development which for example, can be one reason that folic acid supplementation for instance dramatically reduced the incidence of neural tube defects. A major source of one carbon units in the cytoplasm comes from the breakdown of the interconvertible amino acids serine and glycine in the mitochondria. One critical step in this process is the glycine cleavage complex. Inactivation of the components of the glycine cleavage system results in NKH. Pathogenesis incurred in NKH is therefore associated with the block in generating one-carbon units for the cytoplasm. It has been demonstrated herein that formate is capable of reducing homocysteine levels in NKH and it is possible that formate acts to circumvent this block and deliver one-carbon units to the cytoplasm directly and ameliorate pathogenesis.

Alcohol dehydrogenase 5 (ADH5) aka S-nitrosoglutathione reductase (GSNOR), is an enzyme in the alcohol dehydrogenase (ADH) family. It is unique when compared to other ADH enzymes in that primary short-chain alcohols are not its principle substrate. ADH5 metabolizes S-nitrosoglutathione (GSNO), S-hydroxymethylglutathione (the spontaneous adduct of formaldehyde and glutathione), and some alcohols. Under normal conditions, cellular concentration of folate binding proteins exceeds that of folate derivatives, and therefore the concentration of free folate in the cell is negligible. In some embodiments, compositions disclosed herein can include formate or formate derivative or bacteria producing formate or pectin alone or in combinations and can further include at least one of glycine, serine, histidine or methylglycine to treat homocystinuria. The provision of a significant excess of one-carbon donor compounds such as formate, serine, or glycine has the potential to change this formate balance and lead to the oxidation of folate species to formaldehyde which can be genotoxic. The majority of cell types express ADH5 to guard against accumulation of toxic levels of formaldehyde. The detoxification of formaldehyde is initiated by the natural cellular antioxidant defense afforded by glutathione, which spontaneously reacts with formaldehyde to form S-hydroxymethylglutathione. NADP+− dependent oxidation of S-hydroxymethylglutathione to S-formylglutathione is catalyzed by ADH5. S-Formylglutathione is subsequently converted by S-formylglutathione hydrolase (FGH) to formate, which is then free to enter the one-carbon cycle. In addition to the conversion from formate, formaldehyde is also formed in the reaction catalyzed by dimethylglycine dehydrogenase as part of the betaine pathway. In other embodiments, in part to reduce any adverse effects of potential formaldehyde formation and accumulation, taurine and/or n-acetyl cysteine can also be provided to a subject in need thereof (e.g. homocystinuria and NKH) in an effort to boost the available tissue and plasma levels of glutathione with a view towards boosting formaldehyde detoxification.

In some embodiments, compositions disclosed herein can be administered to a subject having homocystinuria and/or NKH. In accordance with these embodiments, compositions to treat homocystinuria and/or NKH can include an effective amount of formate (e.g. homocystinurias), a salt thereof (e.g. homocystinurias, sodium formate), a formate derivative or formate precursor or prodrug agent to lower homocysteine (Hcy) levels in a subject. In certain embodiments, compositions disclosed herein can include pectin for example at mealtime or in a gradual release form. Pectin is a structural acidic heteropolysaccharide contained in the primary cell walls of terrestrial plants. Its main component is galacturonic acid, a sugar acid derived from galactose. It can be fermented in the gut to produce formic acid/formate. Further, it is known that formate can induce the expression of formaldehyde detoxifying enzyme ADH5 (AKA GSNOR). In other embodiments, administration of formate or a formate derivative as disclosed herein to a subject having homocystinuria or NKH can be combined with at least one of taurine and n-acetylcysteine, and/or pectin or other equivalent in order to boost glutathione availability for formaldehyde detoxification and provide supplementary formate to the subject. In certain embodiments, when treating homocystinuria, zinc or zinc-containing agent, taurine and/or n-acetylcysteine, can be combined with any one of formate/formate derivative and/or pectin and/or bacteria capable of producing formate for treating homocystinuria. In some embodiments, compositions disclosed herein can be administered to a subject having homocystinuria and/or NKH. In accordance with these embodiments, compositions to treat homocystinuria and/or NKH can include an effective amount of formate, a salt thereof (e.g. sodium formate), a formate derivative or formate precursor or prodrug agent to lower homocysteine (Hcy) levels in a subject. In certain embodiments, compositions disclosed herein can include pectin alone or in addition to formate or formate derivative or prodrug for example at mealtime or in a gradual release form. It is known that formate can induce the expression of formaldehyde detoxifying enzyme ADH5 (AKA GSNOR). In other embodiments, administration of formate or a formate derivative and/or pectin as disclosed herein to a subject having homocystinuria or NKH can be combined with at least one of taurine and n-acetylcysteine or other equivalent in order to boost glutathione availability for formaldehyde detoxification. In accordance with these embodiments, taurine concentration can be about 10 mg/kg to about 300 mgs/kg; or about 20 mg/kg to about 250 mgs/kg; or about 30 mg/kg to about 200 mgs/kg; or about 50 mg/kg to about 150 mgs/kg provided daily, two or more times per day, every other day or other appropriate dosing regimen separate from or in the same compositions as the other agents. In other embodiments, N-acetylcysteine concentration can be about 20 mg/kg to about 300 mgs/kg; or about 30 mg/kg to about 250 mgs/kg; or about 40 mg/kg to about 200 mgs/kg; or about 100 mg/kg to about 180 mgs/kg provided daily, two or more times per day, every other day or other appropriate dosing regimen separate from or in the same compositions as the other agents. In other embodiments, pectin concentration can be about 2.0 g to about 50 g; or about 3.0 g to about 40 g; or about 4.0 g to about 30 g; or about 6.0 g to about 20 g; or about 7.5 g to about 15 g provided daily, two or more times per day, every other day or other appropriate dosing regimen separate from or in the same compositions as the other agents. In some embodiments, these agents can be administered at the same time in a single composition, simultaneously as separate agents or sequentially administered. In yet other embodiments disclosed herein one or more of the agents can be administered in a gradual release form in order to reduce adverse effects of homocysteine while reducing any adverse effects of a single agent while benefitting from the combination treatment for homocystinurias and NKH. In accordance with these embodiments, taurine concentration can be about 10 mg/kg to about 300 mgs/kg; or about 20 mg/kg to about 250 mgs/kg; or about 30 mg/kg to about 200 mgs/kg; or about 50 mg/kg to about 150 mgs/kg provided daily, two or more times per day, every other day or other appropriate dosing regimen separate from or in the same compositions as the other agents. In other embodiments, N-acetylcysteine concentration can be about 20 mg/kg to about 300 mgs/kg; or about 30 mg/kg to about 250 mgs/kg; or about 40 mg/kg to about 200 mgs/kg, or about 100 mg/kg to about 180 mgs/kg provided daily, two or more times per day, every other day or other appropriate dosing regimen separate from or in the same compositions as the other agents. In other embodiments, pectin concentration can be about 2.0 g to about 50 g; or about 3.0 g to about 40 g; or about 4.0 g to about 30 g; or about 6.0 g to about 20 g; or about 7.5 g to about 15 g provided daily, two or more times per day, every other day or other appropriate dosing regimen separate from or in the same compositions as the other agents. In some embodiments, these agents can be administered at the same time in a single composition, simultaneously as separate agents or sequentially administered.

In certain embodiments, it was observed that there are significantly higher levels of BHMT protein in the long-term betaine treatment group where BHMT mediated remethylation of Hcy is diminished. By this observation, it raised the possibility that the BHMT protein is impaired in its function. Previous work demonstrated that purified BHMT requires a thiol-reducing agent for activity and that prolonged exposure of BHMT to buffers lacking reducing agents results in the slow irreversible loss of its catalytic zinc molecule and a corresponding loss of activity. In this context, further induction of BHMT expression observed in a long-term betaine treatment group could constitute a not entirely successful compensatory mechanism designed to mitigate the effects of diminished BHMT activity.

In other embodiments disclosed herein, it was observed that BHMT is unusual in that it constitutes approximately 2% of total protein in the liver. During long-term betaine treatment this concentration rises to up to four to five fold (about 8-10%) of total hepatic protein which is an enormous amount of protein that would require zinc for its function. The increased requirement for zinc cannot be supplied because zinc cannot be stored in mammals and must be supplemented by diet or other source. Unfortunately, dietary sources of zinc are typically very high in protein and therefore precluded by the low methionine diet required of HCU patients. Therefore, long term betaine treatment in HCU could induce a significant zinc deficiency in a subject, impairing BHMT protein function and concomitantly reducing the betaine response.

In alternative embodiments, zinc or a zinc conjugate or other acceptable zinc delivery agent administered alone or as a combination with a formate, formate derivative, formate prodrug and/or pectin to a subject having NKH and the concentration of zinc or zinc conjugate can be about 1.0 mgs to about 150 mgs; or about 2.0 mgs to about 100 mgs; or about 3.0 mgs to about 80 mgs; or about 4.0 mgs to about 70 mgs; or about 5.0 mgs to about 60 mgs; or about 35 mg to 60 mgs for an adult or about 2 mgs to about 10 mgs for an infant or about 15 mgs to about 35 mgs for a child or adolescent 2-4 times per day, daily, every other day, weekly, or other suitable dosing regimen. In yet other embodiments, a formate or formate derivative as indicated herein can be delivered to the subject before, at the time of or after administering zinc or zinc conjugate (and optionally, copper or copper-containing agent). In some embodiments, a formate or formate derivative in combination with administering zinc or zinc conjugate as disclosed herein (e.g. at the same or different time) can be combined with any standard treatment for NKH known in the art.

In other embodiments, an effective amount of formate, a salt thereof (e.g. sodium formate), a formate derivative or formate precursor or prodrug agent, pectin agent, bacteria producing formate or a derivative thereof to lower homocysteine (Hcy) levels in a subject having HCU noted above can be combined with standard treatments, for example administered before, after or at the time of administering trimethylglycine (e.g. betaine) where trimethylglycine can be administered to a subject at standard concentrations. In accordance with these embodiments, trimethylglycine (e.g. betaine) can be administered or taken at about 10 mg/kg to about 200 mg/kg; or about 20 mg/kg to about 150 mg/kg; or 30 mg/kg to about 100 mg/kg; or 40 mg/kg to about 80 mg/kg; or about 50 mg/kg 2-4 times per day, daily, every other day, weekly, or other suitable administration schedule to the subject. In accordance with these embodiments, trimethylglycine can be administered in doses of about 20 mg/kg to about 200 mg/kg or about 50 mg/kg to about 150 mg/kg as a single administration or multiple administrations to a subject having HCU or at mealtime where the dose is tailored to the number of times taken per day to about 1.0 gram to about a 40.0 gram total per subject in a day. In certain compositions disclosed herein, an effective amount of trimethylglycine (e.g. betaine) in a composition separate from or in combination with a formate or formate agent disclosed herein can be about 1 to about 3% wv/v or about 2% w/v concentration of trimethylglycine (e.g. betaine) in solution (e.g. water or other acceptable medium or excipient).

In certain embodiments, compositions disclosed herein can be administered to a subject having homocystinuria. In accordance with these embodiments, compositions to treat HCU can include an effective amount of zinc to lower homocysteine (Hcy) levels in a subject. In certain embodiments, zinc or a zinc conjugate or other acceptable zinc delivery agent can be administered to a subject can be about 1.0 mgs to about 150 mgs; or about 2.0 mgs to about 100 mgs; or about 3.0 mgs to about 80 mgs; or about 4.0 mgs to about 70 mgs; or about 5.0 mgs to about 60 mgs; or about 35 mg to 60 mgs for an adult or about 2 mgs to about 10 mgs for an infant or about 15 mgs to about 35 mgs for a child or adolescent 2-4 times per day, daily, every other day, weekly, or other suitable regimen. In some embodiments, a zinc supplement can include a combination of 1:1 or 2:1 or 1:2 or other ratio of zinc arginate and zinc glycinate or other suitable form of zinc. In certain embodiments, zinc concentrations can be increased or decreased depending on the length of betaine treatment in a subject and the concomitant determination of requirement for zinc. In addition, it is contemplated herein that prolonged administration of zinc or excessive administration of zinc to a subject can lead to copper depletion. As such, in other embodiments, it is contemplated that zinc and/or betaine supplemental therapy can be combined with a supplement of copper. In accordance with these embodiments, copper-containing agents can be co-administered or administered before or after other treatments. For example, copper glycinate can be administered to a subject at about 0.1 mg to about 5.0 mgs per day or about 1.0 to about 2.0 mgs per day or each time betaine and/or zinc are administered to the subject (e.g. homocystinuria, NKH). It is contemplated herein that administration of these agents can be as a single formulation such as a tablet or liquid, or in multiple dose forms to be administered at mealtime or other appropriate time for administration.

In other embodiments, an effective amount of zinc or a zinc conjugate or other acceptable zinc delivery agent such as a combination of 1:1 or 2:1 or 1:2 or other ratio of zinc arginate and zinc glycinate or other suitable form of zinc to lower homocysteine (Hcy) levels can be combined with standard treatments, for example administered before, after or at the time of administering (e.g. simultaneously) trimethylglycine (e.g. betaine) where trimethylglycine can be administered to a subject at standard concentrations. In accordance with these embodiments, trimethylglycine (e.g. betaine) can be administered or taken at about 10 mg/kg to about 200 mg/kg; or about 20 mg/kg to about 150 mg/kg; or 30 mg/kg to about 100 mg/kg; or 40 mg/kg to about 80 mg/kg; or about 50 mg/kg 2-4 times per day, daily, every other day, weekly, or other suitable administration schedule to the subject. In accordance with these embodiments, trimethylglycine can be administered in doses of about 20 mg/kg to about 200 mg/kg or about 50 mg/kg to about 150 mg/kg as a single administration or multiple administrations to a subject having HCU or at mealtime where the dose is tailored to the number of times taken per day to about 1.0 gram to about a 40.0 gram total per subject in a day. In certain compositions disclosed herein, an effective amount of trimethylglycine (e.g. betaine) in a composition separate from or in combination with a zinc supplement and optionally, a copper supplement disclosed herein can be about 1 to about 3% w/v or about 2% w/v concentration of trimethylglycine (e.g. betaine) in solution (e.g. water or other acceptable medium or excipient).

It is contemplated herein that combination formulations of betaine and zinc and a copper supplement can be provided to a subject having aberrant levels of Hcy as a single composition or in one, two or three separate formulations and administered to a subject at the same time or consecutively. In certain embodiments, it is contemplated that these combination treatment regimens can be used alone or in combination with a formate or formate derivative and/or pectin to significantly reduce dietary compliance needs of a subject having aberrant Hcy levels while reducing symptoms of the condition, improving outcomes and survival.

In some embodiments, compositions to treat homocystinuria can include an effective amount of formate, a salt thereof (e.g. sodium formate), a formate derivative or formate precursor or prodrug agent in combination with zinc or a zinc containing agent to lower homocysteine (Hcy) levels in a subject. In accordance with these embodiments, compositions to treat homocystinuria and/or NKH can include an effective amount of formate, a salt thereof (e.g. sodium formate), a formate derivative or formate precursor or prodrug agent to lower homocysteine (Hcy) levels in a subject. For a subject having NKH, it may be preferred to use a derivative of formate instead of formate or a formate salt (or pectin or bacteria capable of producing formate) to reduce any potential adverse effects while providing supplementary formate. In certain embodiments, a formate derivative or other agent can include a formate prodrug esterified to glycerol, for example, diformylglycerol, triformylglycerol (e.g. triformin) in an oil form, or other suitable form or combined with one or more excipients to improve bioavailability of formate or formate derivative. Alternatively, a formate derivative or prodrug contemplated herein can include a diformylglycerol-glucose conjugate or diformylglycerophosphocholine, diformylglycerophosphoethanolamine, or as a mixed glycerol ester, or other suitable form or combined with one or more excipients to improve bioavailability. In some embodiments, the concentration of formate or formate derivative administered to a subject in combination with zinc can be about 0.5 mg/kg to about 100.0 mg/kg; or about 2.0 mg/kg to about 80 mg/kg; or about 3.0 mg/kg to about 70 mg/kg: or 4.0 mg/kg to about 60 mg/kg; or 5.0 mg/kg to about 50 mg/kg of formate or formate derivative, 2-4 times per day, daily, every other day, weekly, or other suitable administration schedule. In certain embodiments, zinc or a zinc conjugate or other acceptable zinc delivery agent administered as a combination with a formate above to a subject can be about 0.5 mg/kg to about 100.0 mg/kg; or about 2.0 mg/kg to about 80 mg/kg; or about 3.0 mg/kg to about 70 mg/kg: or 4.0 mg/kg to about 60 mg/kg; or 5.0 mg/kg to about 50 mg/kg, 2-4 times per day, daily, every other day, weekly, or other suitable administration schedule. In some embodiments, a zinc supplement can include a combination of 1:1 or 2:1 or 1:2 or other ratio of zinc arginate and zinc glycinate or other suitable form of zinc. In yet other embodiments, a formate or formate derivative as indicated herein can be delivered to the subject before, at the time of or after administering zinc or zinc conjugate and, optionally a copper supplement. In some embodiments, a formate derivative or formate in combination with administering zinc or zinc conjugate as disclosed herein (e.g. at the same or different time) can be combined with any standard treatment; for example, trimethylglycine (e.g. betaine) where trimethylglycine can be administered to a subject at standard concentrations as noted above.

In other embodiments, compositions contemplated herein can include a pharmaceutically acceptable formulations of formate, a salt thereof (e.g. sodium formate), a formate derivative or formate precursor or prodrug agent for administration to a subject. In certain embodiments, compositions can include zinc or a zinc conjugate or other acceptable zinc delivery agent alone or in combination with formate or formate prodrug disclosed herein. In yet other embodiments, compositions contemplated herein can include formate and/or zinc and/or a standard treatment for homocystinuria such as trimethylglycine (e.g. betaine). In certain embodiments, a zinc-containing composition can be combined with a standard treatment for homocystinurias such as trimethylglycine (e.g. betaine, such as an anhydrous betaine, betaine hydrochloride). Modes of administration for these compositions can include any mode suitable for delivery of such agents such as oral administration by tablet, gel caplet, slow-release formulation, intravenously, intra-rectally, or subcutaneously administered or other mode of administration.

In some embodiments, amino acid supplements are contemplated herein to treat aberrant Hcy levels in a subject. In certain embodiments, amino acids contemplated herein can be used to supplement any dosing regimen of formate or formate derivative, pectin or bacteria producing formate, zinc or zinc-containing agent, standard treatment or other composition, formulation or dose regimen contemplated herein. In accordance with these embodiments, amino acids can include, but are not limited to glycine, seine, tryptophan, methylglycine (sarcosine), histidine or other suitable amino acid. In certain embodiments, concentrations contemplated herein can be about 0.01% w/v to about 10.0% w/v or about 0.02% w/v to about 1.0% w/v or other suitable concentration of an amino acid, alone or in combination with other compositions and formulations disclosed herein.

In some embodiments, compositions or formulations disclosed herein can be administered in powder form, tablet, mixed in with other consumables, by microparticle, by buccal patch, intravenously, in a slow or time-release microparticle, other known time-delivery format or method or in an aqueous solution such as administration intravenously or in a suitable consumable liquid such as water or other consumable. In certain embodiments, an effective amount of a composition or formulation can be administered for homocystinuria or NKH management (e.g., for a subject's lifetime). In some embodiments, the compositions or formulations disclosed herein can include tetrahydrofolate donor compounds and can further facilitate remethylation of Hcy in a subject having homocystinuria (e.g. HCU).

In other aspects of the present invention, methods disclosed herein include treating a subject having homocystinuria (HCU). In accordance with the embodiments, methods can include identifying a subject in need of lowering Hcy levels or having been diagnosed with HCU and administering an effective amount of a composition comprising formate or a formate derivative disclosed herein to the subject and lowering Hcy in the subject. In some embodiments, a formate or a formate derivative can be administered at mealtime to the subject alone or in combination with standard treatments for lowering Hcy; and/or in combination with zinc or zinc-containing agent. In certain aspects of the invention, compositions disclosed herein for treating a subject having aberrant levels of Hey can reduce or eliminate the need for monitoring the diet of the subject depending on the subject being treated and level of Hcy in the subject or other factors. In certain aspects of the invention, formate or a formate derivative and/or zinc or zinc-containing agent is capable of prolonging the effects of, or reducing the tolerance of standard Hcy management regimens (e.g. betaine administration). Some methods include facilitating remethylation of the Hcy with the sodium formate in the composition. The sodium formate may serve as a tetrahydrofolate donor compound. In other embodiments, compositions disclosed herein decrease plasma tHcy levels by at least 10, to about 20, to about 30, to about 40, to about 50, to about 60% or more using an effective amount of a composition including formate or formate derivative.

In other embodiments, compositions disclosed herein decrease plasma tHcy levels by about 30, to about 40, to about 50, to about 60, to about 70, to about 80 or about 90% or more using an effective amount of a composition including formate or formate derivative and a standard treatment. In one embodiment, these formulations were capable of reducing tHcy levels to near levels of a subject not having an aberrant Hcy disorder (e.g. from approximately 335 µm to 20 µm).

Pharmaceutical Compositions

Pharmaceutically acceptable salts as contemplated herein are known in the art and can be prepared using standard methods. See, for example, Remington's Pharmaceutical Sciences, 20th ed., Lippincott Williams & Wilkins, Baltimore, Md., 2000. p. 704; and "Handbook of Pharmaceutical Salts: Properties, Selection, and Use." P. Heinrich Stahl and Camille G. Wermuth. Eds., Wiley-VCH. Weinheim, 2002. Pharmaceutically acceptable salt can include alkali metal salts, including sodium or potassium salts; alkaline earth metal salts, e.g., calcium or magnesium salts; and salts formed with suitable organic ligands, e.g., quaternary ammonium salts. Examples of suitable formate salts include calcium formate, sodium formate, ammonium formate, potassium formate, magnesium formate, and combinations thereof.

It is contemplated herein that bacteria or other microorganism capable of producing formate are known in the art. Any microorganism such as bacteria capable of producing formate or a formate derivative and modified for administration to a subject are contemplated for use to treat a subject having homocystinuria or NKH alone or with other agents disclosed herein.

Exemplary methods of administering a composition and/or formulation disclosed herein can include: oral administration, for example, drenches (aqueous or non-aqueous solutions or suspensions), tablets, dissolving buccal patch, e.g., those targeted for buccal, sublingual, and systemic absorption, boluses, powders, granules, pastes for application to the tongue; parenteral administration, for example, by subcutaneous, intra-rectal, intramuscular, intravenous or epidural injection as, for example, a sterile solution or suspension, or sustained-release formulation; and topical administration, for example, as a cream, patch, ointment, or a controlled-release patch or spray applied to the skin. Any other known methods for administering compositions and/or formulations disclosed herein are considered plausible given the types of compositions and/or formulations.

"Treatment" as used herein can refer to any treatment of a condition in a mammal and can include: preventing the condition from occurring in a subject which may at risk of developing the condition (e.g. genetic inheritance or other pre-disposition) but does not have the condition; inhibiting advancement of the condition or symptoms thereof (e.g., maintaining the current state without progression or stabilizing the condition in the subject) or treating the condition by reducing or eliminating the condition or symptoms thereof, (e.g., causing regression or elimination of the condition). Therapeutic agents disclosed herein (e.g. formate or formate derivative; zinc or zinc-containing agent) can be administered before, during or after the onset of the condition. Treatment of an ongoing condition, where treatment stabilizes or reduces undesirable clinical symptoms of the condition is contemplated herein. In some embodiments, treatment can be performed prior to partial and/or complete loss of function of one or more affected tissues and/or organs in a subject. In certain embodiments, treatment can be administered during symptomatic stages of the condition, and in some examples after the symptomatic stages of the condition have occurred in a subject.

In some embodiments, effective amount of an agent (e.g formate and/or betaine and/or zinc, etc.) can refer to a particular amount of a pharmaceutical composition including a therapeutic agent that achieves a clinically beneficial result (e.g., for example, a reduction of symptoms or side effects of the condition). Toxicity and therapeutic efficacy of such compositions can be determined by one of skill in the art by, for example, determining the $LD_{50}$ (the dose lethal to 50% of the population) and the $ED_{50}$ (the dose therapeutically effective in 50% of the population). The dose ratio between toxic and therapeutic effects is the therapeutic index, and it can be expressed as the ratio $LD_{50}/ED_{50}$. Compounds that exhibit large therapeutic indices are preferred. Data obtained from these studies can be used in formulating a range of dosage for a particular subject having or suspected of developing the condition. Dosage of such compounds can be a range of circulating concentrations that includes the $ED_{50}$ with little or no toxicity. Dosage can vary within this range depending upon the dosage form employed, sensitivity of the subject, age of the subject and other standard parameters tested, and the route and frequency of administration.

It is contemplated that regimens used to treat homocystinuria or NKH as disclosed in some embodiments of the present invention can be checked for efficacy. In accordance with these embodiments, treatment regimens can be modified by a health professional to achieve desired outcomes as needed. In certain embodiments, levels of homocystinuria are measured before and after treatment or periodically in a subject having homocystinuria or NKH to assess efficacy and regimens are adjusted as necessary.

Kits

In some embodiments, composition disclosed herein can be present in one or more containers or vials, e.g., single use or multi-use containers or vials. In other embodiments, multi-use vials can include a rubber diaphragm suitable for retrieving multiple doses of the agent or a container for storing tablets or caplets or other orally administered agent. In other embodiments, compositions and formulations disclosed herein can be stored for administration to a subject in a bag for intravenous delivery. In certain embodiments, the composition can be diluted in a suitable diluent for administration. In some embodiments, compositions or formulations disclosed herein can be delivered to a subject in a buccal patch for rapid delivery or other delivery method such as a slow-release microparticle disclosed herein. In other embodiments, compositions and formulations disclosed herein can be stored as part of a kit for treating homocystinuria or NKH or other condition having aberrant Hcy production and can include at least one delivery device.

In some embodiments, the kit or composition can include a single-dose or multiple doses such as a week or month's supply of any composition or multiple compositions disclosed herein. In other embodiments, compositions disclosed herein can be part of a liquid formulation or readily available for adding to a liquid consumable such as water, a dietary supplement or other liquid form. In some embodiments, compositions disclosed herein can include a preservative. In other embodiments, a delivery device can include a syringe or intravenous delivery. In other embodiments, a syringe can be used to or is adapted for use to deliver the composition.

In certain embodiments, the subject is a mammal (e.g. horse, dog, cat, cow, pig, sheep, goat, rabbit). In other embodiments, the subject is a human. In yet other embodiments, the subject is an unborn child (a fetus), a baby, a toddler, a young child, a child or adolescent or teenager. In other embodiments, the subject is an adult of 18 years or older.

EXAMPLES

The following examples are included to illustrate various embodiments. It should be appreciated by those of skill in the art that the techniques disclosed in the examples which follow represent techniques discovered to function well in the practice of the claimed methods, compositions and apparatus. However, those of skill in the art should, in light of the present disclosure, appreciate that changes may be made in the some embodiments which are disclosed and still obtain a like or similar result without departing from the spirit and scope of the invention.

Example 1

In one exemplary method, as illustrated in FIG. 1 pathways of production and control of aberrant homocysteine (Hcy) are studied. FIG. 1 is an exemplary schematic diagram of methionine, cysteine and choline metabolism in mammals related to embodiments disclosed herein. Referring to FIG. 1, the transsulfuration pathway, methionine-folate cycles and the choline-betaine pathways are illustrated. Betaine-aldehyde dehydrogenase (BHDH) Betaine-homocysteine S-methyltransferase (BHMT), choline dehydrogenase (CHDH) cystathionine β-synthase (CBS), cystathionine γ-lyase (CGL), cysteinesulfinate decarboxylase (CASD) cysteine dioxygenase (CDO), dimethylglycine dehydrogenase DMGDH), glycine N-methyltransferase (GNMT), glycine cleavage system (GCS), methionine adenosyl transferase (MAT1A), methionine synthase (MTR), methylenetetrahydrofolate reductase (MTHFR), methylglycine dehydrogenase (MGDH), S-adenosyl homocysteine hydrolase (SAHH) are identified in the figure for ease of reference.

As illustrated in FIG. 1, one major regulatory point in the Hcy-betaine pathway response occurs after betaine is converted to dimethylglycine (DMG) during remethylation of Hcy where DMG can serve as an allosteric inhibitor of BHMT and further BHMT activity requires its removal via dimethylglycine dehydrogenase (DMGDH) followed by MG (sarcosine) production to glycine production via dehydrogenase (MGDH) and subsequent degradation of glycine by the glycine cleavage system.

As observed in this schematic diagram, these three later steps have a need for the folate compound tetrahydrofolate (THF) as a co-factor. Methionine synthase (MTR) deficiency can create a "methyl-folate trap" due at least in part to the generation of 5-methyl-THF (5-Me-THF) which is irreversible. Interruption of this MTR pathway to convert Hcy to methionine and or THF prevents conversion of Hcy to THF resulting in adverse accumulation of 5-Me-THF and significant depletion of THF. Therefore, as disclosed herein, one aspect of embodiments of the instant invention is directed to improving betaine performance and it is understood that reduced betaine efficacy can be due at least in part to depleted THF levels. Exemplary compositions and methods disclosed herein are directed to improving betaine efficacy and directed to improving THF levels in a subject having overproduction of Hcy.

Homocystinuria induces multiple interruptions in hepatic one-carbon metabolism (OCM) with the potential to impair betaine treatment by limiting THF supply. Further, aberrant Hcy levels in a HCU mouse model was observed to induce hepatic 5-Me-THF accumulation and repress dihydrofolate reductase. ALDH1l1, GART and AMT and GLDC-all of these repressions have the potential to limit THF supply and thus impair the betaine response.

The HO Transgenic Mouse Model of HCU

In one exemplary method, an acceptable mouse mode of HCU is used to study various effects of exemplary compositions disclosed herein on aberrant Hcy levels. To date, the majority of research on HCU has been performed using a CBS knockout mouse model. These Cbs (−/−) animals suffer from pronounced liver injury and typically die within 2-3 weeks of birth. It has been demonstrated that betaine treatment improved survival of Cbs (−/−) mice and restored fertility to female Cbs (−/−) mice, but without significantly lowering Hcy. Surviving Cbs (−/−) mice failed to show any alteration in coagulation parameters compared to wild-type controls and exhibited severe liver injury, steatosis, and fibrosis that were not significantly improved by betaine treatment. The failure of betaine treatment to lower Hcy in Cbs null mice is most likely due to the influence of severe liver injury upon hepatic BHMT expression. The fact that betaine treatment significantly improved survival in Cbs null mice without significantly lowering tHcy indicates that this compound may exert significant protective effects in HCU independent of its role as a substrate for BHMT.

To date, the only animal model of HCU that has been demonstrated to accurately recapitulate the biochemical response to betaine that is typically observed in human subjects with HCU, is a transgenic model in which the mouse Cbs gene is inactivated and that exhibits very low-level expression of the human CBS gene under the control of the human CBS promoter. This mouse model, designated "human only" (HO), exhibits severe elevations in both plasma and tissue levels of Hcy, methionine, AdoMet, and AdoHcy and a concomitant decrease in plasma and hepatic levels of cysteine.

In addition, betaine treatment of the HO model demonstrates an increase in plasma methionine, DMG, MG, and cysteine respectively ($P<0.0001$ for all four metabolites). Lowering plasma tHcy by betaine treatment also resulted in a 40% decrease in plasma AdoMet ($P=0.0039$) and a fivefold decrease in AdoHcy levels ($P<0.0001$). These data indicate that the HO mouse recapitulates the biochemical response of human subjects with HCU to betaine treatment. This mouse model constitutes a suitable model for investigating ways to optimize the therapeutic effects of treatments for HCU in a human subject.

The HO mouse model of HCU exhibits constitutive expression of multiple pro-inflammatory cytokines and a hypercoagulative phenotype both of which respond to short-term standard (e.g. betaine) treatment. Investigation of the effects of long-term betaine treatment in the absence of methionine-restriction in HO HCU mice revealed that the ability of betaine treatment to lower homocysteine diminished significantly over time. Plasma metabolite analysis indicated that this effect was due at least in part, to reduced betaine-homocysteine S-methyltransferase (BHMT) mediated remethylation of homocysteine. An observed increase in plasma homocysteine during prolonged betaine treatment was accompanied by a significant increase in the plasma levels of TNF-α and IL-Ip and reversion to a hypercoagulative phenotype. Despite this decrease in the ability to respond to betaine, significantly higher levels of BHMT protein was observed during long-term betaine treatment indicating that the specific activity of this enzyme had decreased.

Exemplary experiments using the HO mouse model and various Hcy lowering treatments are disclosed herein for studying HCU. In certain exemplary methods, formate treatment alone or combined with betaine may dramatically improve clinical outcome in HCU. These treatments may be able to remove the need for a methionine restricted diet in a subject having HCU. It was observed that aberrant levels of Hcy can induce significant dysregulation of OCM and that formate or a formate derivative is capable of exerting its therapeutic effects by serving as a THF donor compound and thus can lead to remethylation of Hcy.

In the following exemplary experiments, it was observed that betaine supplementation was limited as observed in a mouse model of MTR deficient homocystinuria. As noted in FIG. 1, Homocystinuria can occur due to defects in the Hcy remethylation enzymes MTR or MTHFR. It was observed that supplementation of betaine in certain experiments with a mouse model of MTR deficient homocystinuria lead to reduction of tHcy of approximately 25% having little effect on the condition. This modest decrease in betaine mediated treatment of MTR deficient homocystinuria has also been observed in human patients with this form of homocystinuria.

Figure 2:
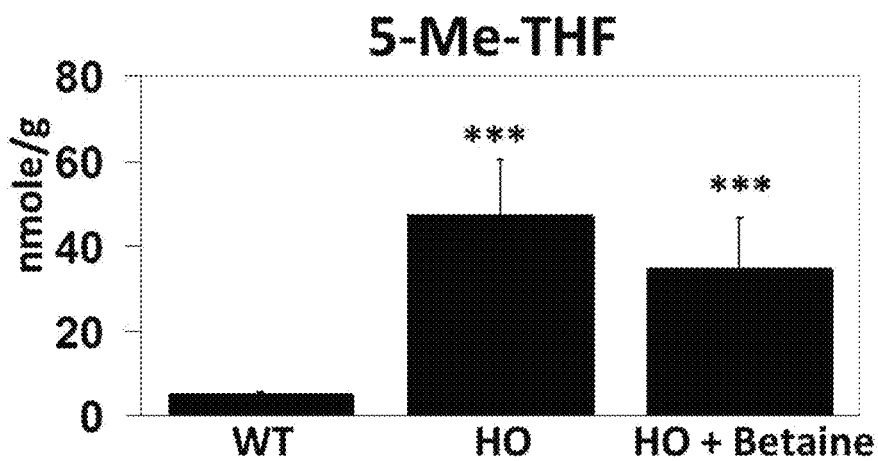
FIG. 2 represents an exemplary comparison of the effects of trimethylglycine (e.g. betaine) compared to controls of the levels of hepatic 5-methyl-THF in a HCU mouse model (e.g. HO, human only, mice) for wild type (WT), treated (HO+betaine) and untreated mice (HO) in certain embodiments disclosed herein.

As illustrated in one example, see FIG. 2, HCU (HO) induces a significant accumulation of hepatic 5-methyl-THF which by sequestering one carbon units has the potential to decrease the available pool of THF available to the betaine pathway for lowering Hcy. FIG. 2 illustrates an example of hepatic metabolomic analysis of HO and WT controls compared to an HO mouse treated with betaine. Comparative hepatic metabolomic analysis of HO mice and WT controls illustrate about a 10-fold accumulation in the MTHFR product 5-MeTHF. Betaine treatment alone reduced 5-MeTHF by about 15-25%. Data illustrated in FIG. 2 is derived from the livers of 8 (4 male, 4 female) individual HO or WT or HO Betaine mice per group. Betaine was given at 3% w/v in drinking water given ad libitum. $P<0.0001$ vs WT.

Example 2

Figure 3:
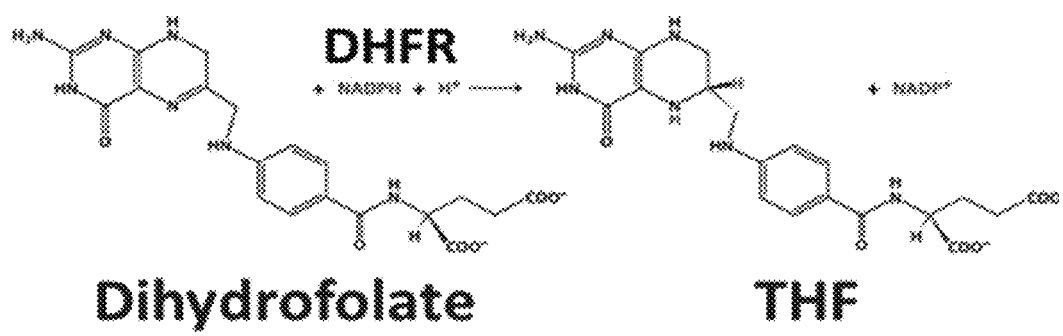
FIG. 3 illustrates an exemplary supply chain of THF through the enzyme dihydrofolate reductase (DHFR) where DHFR reduces dihydrofolate to THF using NADPH as an electron donor in certain embodiments disclosed herein.

FIG. 3 illustrates an exemplary supply chain of THF through the enzyme dihydrofolate reductase (DHFR) where DHFR reduces dihydrofolate to THF using NADPH as an electron donor in certain embodiments disclosed herein. As indicated above, induction of this pathway can serve to supplement THF in a subject having HCU. Hepatic DHFR expression is strongly repressed in HCU in a manner likely to diminish THF availability for the betaine pathway.

Figures 4A, 4B:
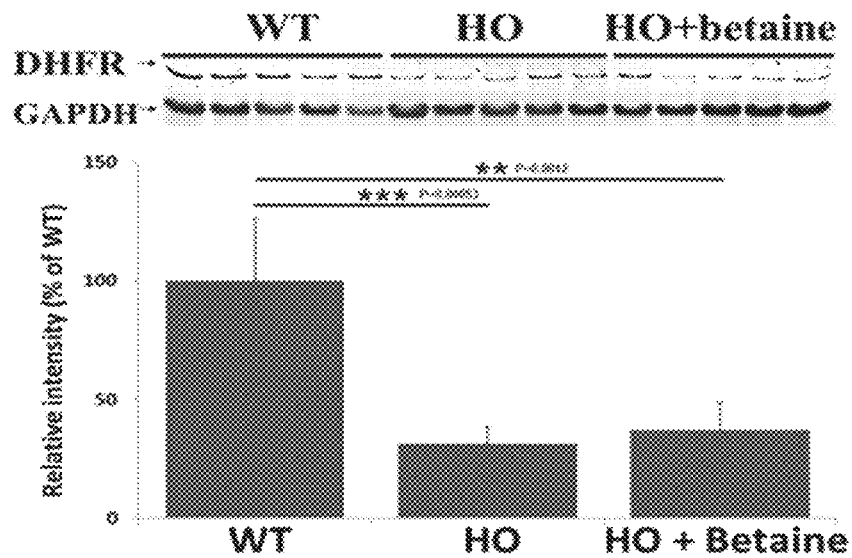
FIGS. 4A-4B represents a Western blot comparing the level of DHFR and GAPDH (control) for wild type (WT), treated (HO+betaine) and untreated mice (HO) using the HCU mouse model (A); and further illustrating in a histogram plot (B), level of intensity of DHFR for wild type (WT), treated (HO+betaine) and untreated mice (HO) using the HCU mouse model in certain embodiments disclosed herein.

In other exemplary experiments, levels of DHFR were assessed using the HO mouse model in untreated and betaine treated mice. As illustrated in an exemplary Western blot, level of DHFR compared to a control enzyme, GAPDH were observed for various conditions, wild type (WT) without a condition and treated (HO+betaine) compared to untreated mice (HO) using the HCU mouse model (4A). In addition, intensity levels of DHFR were measured and further illustrated in a histogram plot. As illustrated, level of intensity of DHFR for wild type (WT), treated (HO+betaine) and untreated mice (HO) using the HCU mouse model was examined. It is noted that the level of DHFR in betaine treated mice was not restored to control levels and only about a 5-10% improvement was observed (4B). (See FIGS. 4A-4B). As noted herein, Western blotting analysis of hepatic DHFR protein levels in WT and HO HCU mice. N=9 per group. These data are representative of three independent experiments.

Example 3

Figure 5:
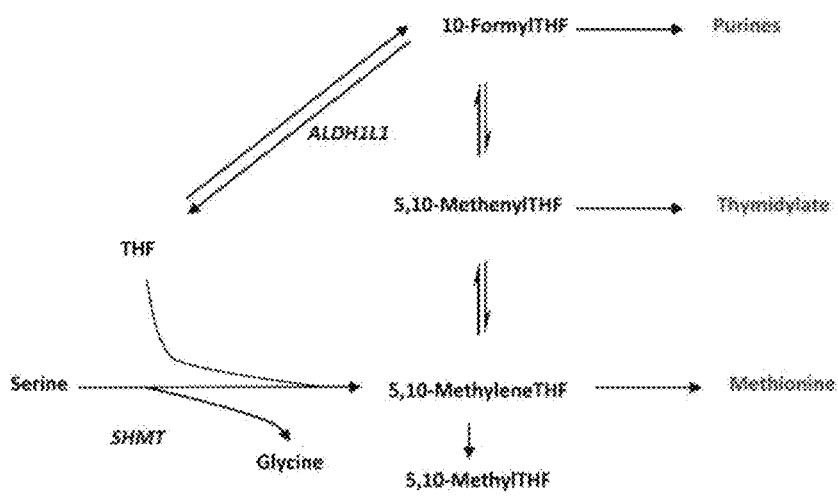
FIG. 5 is a schematic of a pathway where 10-formyltetrahydrofolate dehydrogenase ALDH1l1 catalyzes conversion of 10-formyltetrahydrofolate, NADP, and water to tetrahydrofolate (THF), NADPH, and carbon dioxide to generate methionine and other agents in certain embodiments disclosed herein.

As illustrated in FIG. 5, a schematic is presented of a relevant pathway to embodiments disclosed herein where 10-formyltetrahydrofolate dehydrogenase ALDH1l1 catalyzes conversion of 10-formyltetrahydrofolate, NADP, and water to tetrahydrofolate (THF), NADPH, and carbon dioxide to generate 5, 10 MethylTHF and methionine and other agents.

Figures 6A, 6B:
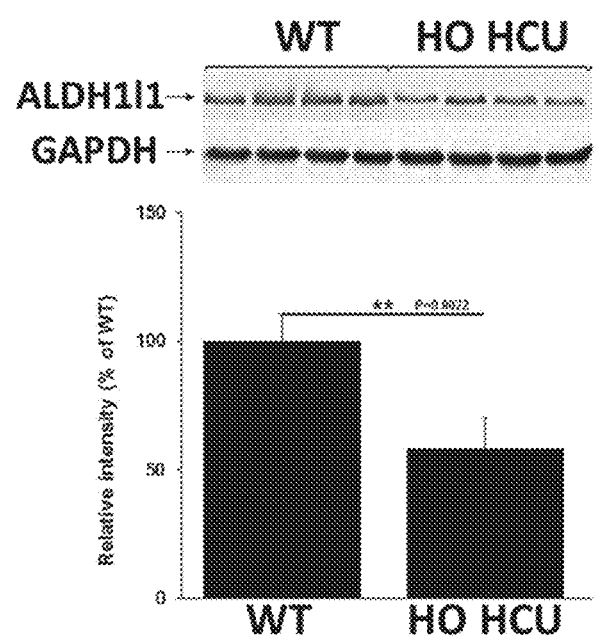
FIGS. 6A-6B represents a Western blot comparing the level of ALDH1l1 and GAPDH (control) for wild type (WT) and untreated (HO HCU) mice (HO) using the HCU mouse model (A); and further illustrating in a histogram plot (B), level of intensity of ALDH1l1 for wild type (WT) and untreated (HO HCU) of the HCU mouse model in certain embodiments disclosed herein.

In another exemplary method, levels of the catalyst enzyme ALDH1l1 were measured in WT and experimental HO mice having aberrant Hcy levels. As illustrated in FIGS. 6A-6B, a Western blot image represents the level of ALDH1l1 and GAPDH (control) for wild type (WT) and untreated (HO HCU) mice (HO) using the HCU mouse model (6A); and further illustrating in a histogram plot (6B), level of intensity of ALDH1l1 for wild type (WT) and untreated (HO HCU) of the HCU mouse model. As observed herein the level of ALDH1l1 in the HCU mouse model was significantly reduced by about 50% or more. Western blot analysis of hepatic ALDH1l1 protein levels in WT and HO HCU mice had an N=9 per group. This FIG. 6A-6B is representative of three independent experiments.

Example 4

Figure 7:
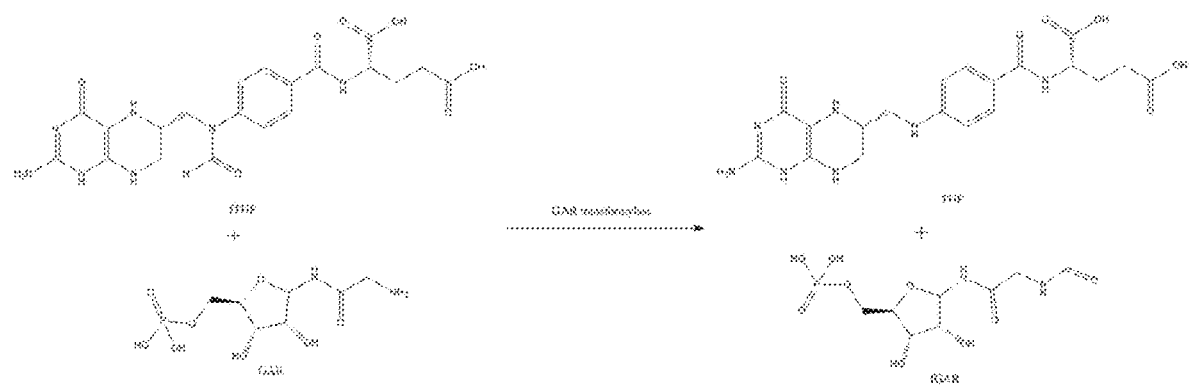
FIG. 7 is a schematic of a pathway where GART (also referenced as AIRS; GARS; PAIS; PGFT; PRGS; GARTF) is represented. GART is a trifunctional polypeptide having all three of phosphoribosylglycinamide formyltransferase, phosphoribosylglycinamide synthetase, phosphoribosylaminoimidazole synthetase activities which lead to de novo purine biosynthesis. Phosphoribosylglycinamide formyltransferase of GART is capable of generating THF from 10=formylTHF during de novo purine synthetic pathway in certain embodiments disclosed herein.

FIG. 7 is a schematic of a pathway where GART (also referenced as AIRS; GARS; PAIS; PGFT; PRGS; GARTF) is represented. GART is a trifunctional polypeptide having all three of phosphoribosylglycinamide formyltransferase, phosphoribosylglycinamide synthetase, phosphoribosylaminoimidazole synthetase activities which lead to de novo purine biosynthesis. Phosphoribosylglycinamide formyltransferase of GART is capable of generating THF from 10=formylTHF during de novo purine synthetic pathway in certain embodiments disclosed herein. In some exemplary experiments, GART levels were measured in WT and experimental HO mice having aberrant Hcy levels.

Figures 8A, 8B:
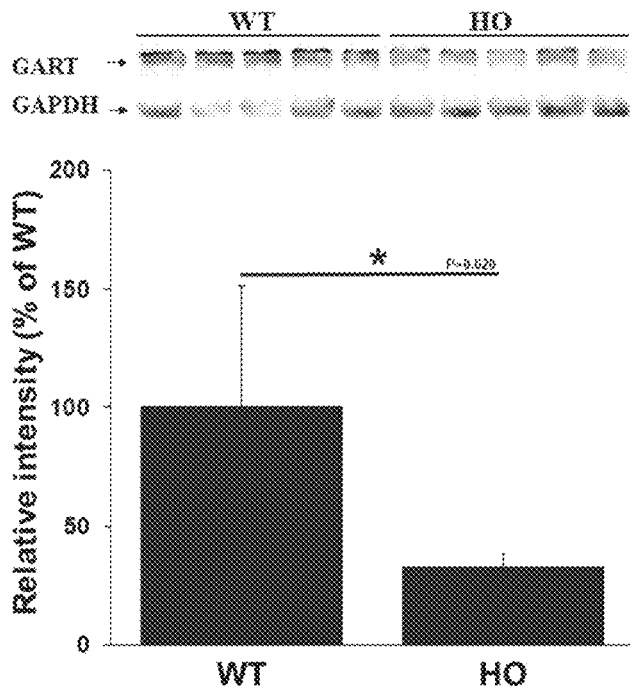
FIGS. 8A-8B represents a Western blot comparing the level of GART and GAPDH (control) for wild type (WT) and untreated (HO) mice (HO) using the HCU mouse model (A); and further illustrating in a histogram plot (B), level of intensity of GART for wild type (WT) and untreated (HO) of the HCU mouse model in certain embodiments disclosed herein.

FIGS. 8A-8B represents a Western blot comparing the level of GART and GAPDH (control) for wild type (WT) and untreated (HO) mice (HO) using the HCU mouse model (8A); and further illustrating in a histogram plot (8B), level of intensity of GART for wild type (WT) and untreated (HO) of the HCU mouse model in certain embodiments disclosed herein. It was observed that HCU acts to repress hepatic GART expression with a likelihood to reduce the hepatic cellular THF pool in a subject. Western blotting analysis of hepatic GART protein levels in WT and HO HCU mice of this FIGS. 8A and 8B represent an N=9 per group. This figure is representative of three independent experiments.

Example 5

One major source of one-carbon units is derived from catabolism of the interconvertible amino acids serine and glycine in the mitochondria in a process catalyzed by the glycine cleavage system (GCS). The GCS is a series of enzymes that are triggered in response to high concentrations of the amino acid glycine and catalyze the degradation of this compound. The GCS is composed of four proteins: the T-protein (AMT, aminomethyltransferase), P-protein (GLDC, glycine dehydrogenase), L-protein (DLD, dihydrolipoyl dehydrogenase), and H-protein which is modified with lipoic acid and interacts with all other components in a cycle of reductive methylamination (catalyzed by the P-protein), methylamine transfer (catalyzed by the T-protein) and electron transfer (catalyzed by the L-protein). All four components are required for proper functioning of this pathway.

For example, the H-protein is responsible for interacting with the three other proteins and acts as a shuttle for some of the intermediate products in glycine decarboxylation. The GCS is associated with the inner membrane of the mitochondria. All four components are required for function.

Because the GCS plays a critical role in supplying one-carbon units to the cytoplasm where remethylation of Hcy can take place, exemplary experiments were performed in order to examine the effect of HCU upon protein level of the T-protein (AMD) and the P protein (GLDC) in the livers of experimental, HO HCU mice (9 mice). It is noted that Hepatic expression of two components of the GCS (A, AMT and B GLDC) are strongly repressed in HO HCU mice. This repression will act to limit the normal transfer of one carbon units formed via catabolism of serine and glycine, from the mitochondria to the cytoplasm where the remethylation of Hcy to methionine by BHMT occurs.

Figures 9A, 9B:
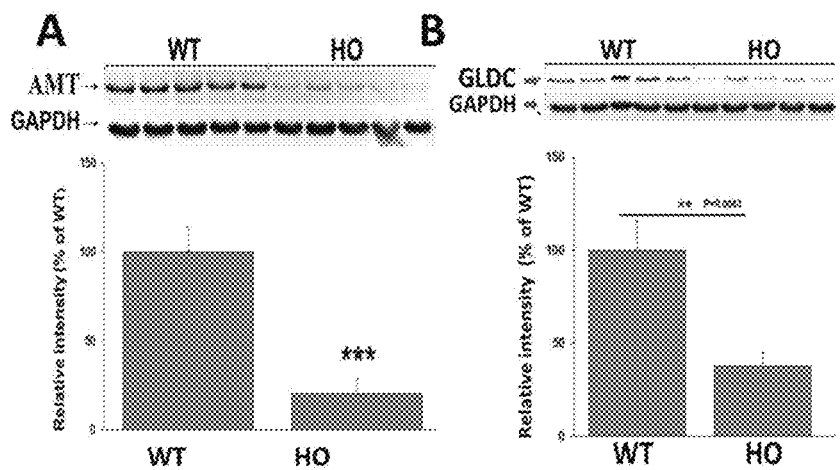
FIGS. 9A-9B represents a Western blot (9A top) comparing the level of AMT and GAPDH (control) for wild type (WT) and untreated (HO) mice (HO) using the HCU mouse model and further illustrating in a histogram plot (9A bottom), level of intensity of the glycine cleavage complex component T-protein aminomethyltransferase (AMT) for wild type (WT) and untreated (HO) while 9B (top) represents a Western blot comparing the level of the glycine cleavage component P-protein glycine dehydrogenase (GLDC) and GAPDH (control) for wild type (WT) and untreated (HO) mice (HO) using the HCU mouse model (A) and further illustrating in a histogram plot (9B bottom), level of intensity of GLDC for wild type (WT) and untreated (HO) (9B) of the HCU mouse model in certain embodiments disclosed herein.

As illustrated in FIGS. 9A-9B, a Western blot (9A top) comparing the level of AMT and GAPDH (control) for wild type (WT) and untreated (HO) mice (HO) using the HCU mouse model and further illustrating in a histogram plot (see 9A bottom), while FIG. 9B represents the level of intensity of AMT for wild type (WT) and untreated (HO) including a Western blot top part of 9B comparing the level of GLDC and GAPDH (control) for wild type (WT) and untreated (HO) mice (HO) using the HCU mouse model and further illustrating in a histogram plot (9B bottom), level of intensity of GLDC for wild type (WT) and untreated (HO) of the HCU mouse model in certain embodiments disclosed herein. It is noted that the Western blotting analysis of hepatic AMD and GLDC protein level in WT and HO HCU mice represents an N=9 per group. This Figure represents three independent experiments.

Example 6

In other exemplary experiments, it is noted that methotrexate (MTX) treatment represses hepatic DMGDH protein levels even further in experimental HO HCU mice which supports the hypothesis that expression of this enzyme is sensitive to THF levels. In accordance with these methods, Western blot analysis of hepatic DMGDH protein levels in HO HCU mice in the presence and absence of methotrexate levels were assessed.

Figures 10A, 10B:
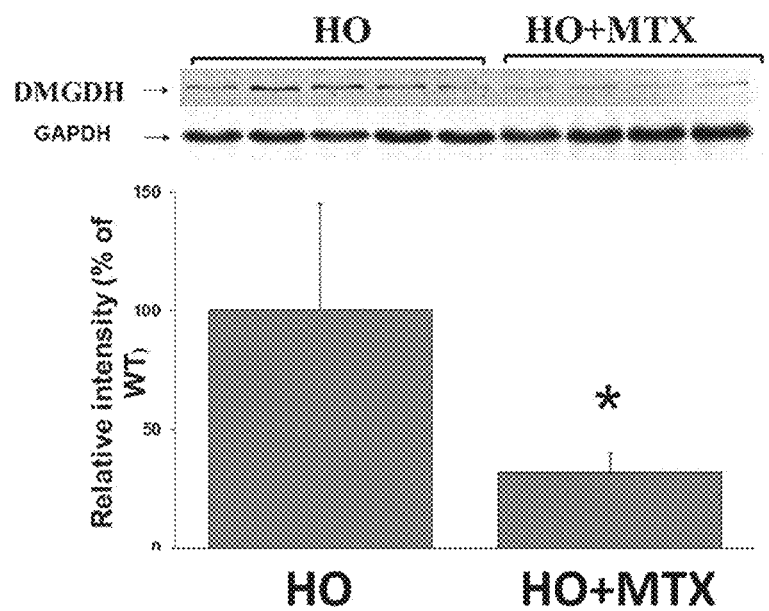
FIGS. 10A-10B represents a Western blot comparing the level of DMGDH and GAPDH (control) for untreated (HO) and treated (HO+MTX, methotrexate) mice (HO) using the HCU mouse model (A); and further illustrating in a histogram plot (B), level of intensity of DMDGH for untreated (HO) and treated (HO+MTX, methotrexate) mice (HO) using the HCU mouse model in certain embodiments disclosed herein.

As illustrated herein, FIGS. 10A-10B represents a Western blot comparing the level of DMGDH and GAPDH (control) for untreated (HO) and treated (HO+MTX, methotrexate) mice (HO) using the HCU mouse model (10A); and further illustrated in a histogram plot (10B), level of intensity of DMDGH for untreated (HO) and treated (HO+MTX, methotrexate) mice (HO) using the HCU mouse model. This figure represents an N=9 per group and this figure is a representative of three independent experiments. $P<0.05$.

Example 7

Figure 11:
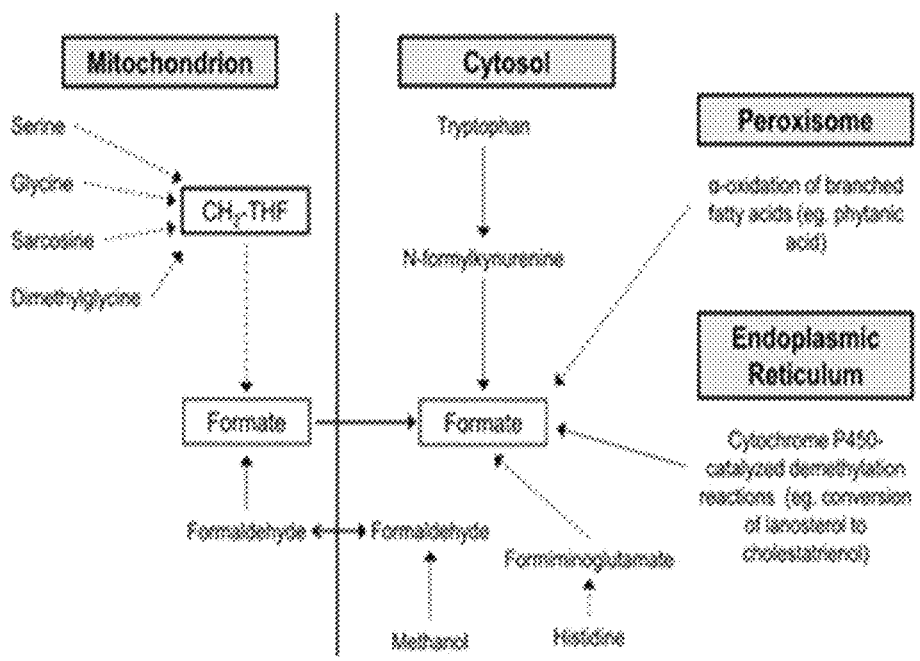
FIG. 11 is a schematic diagram of formate synthesis where multiple amino acids can serve as formate donors of certain embodiments disclosed herein.

FIG. 11 represents importance of formate in multiple pathways and is a schematic diagram of formate synthesis where multiple amino acids can serve as formate donors of certain embodiments disclosed herein.

Figures 12A, 12B:
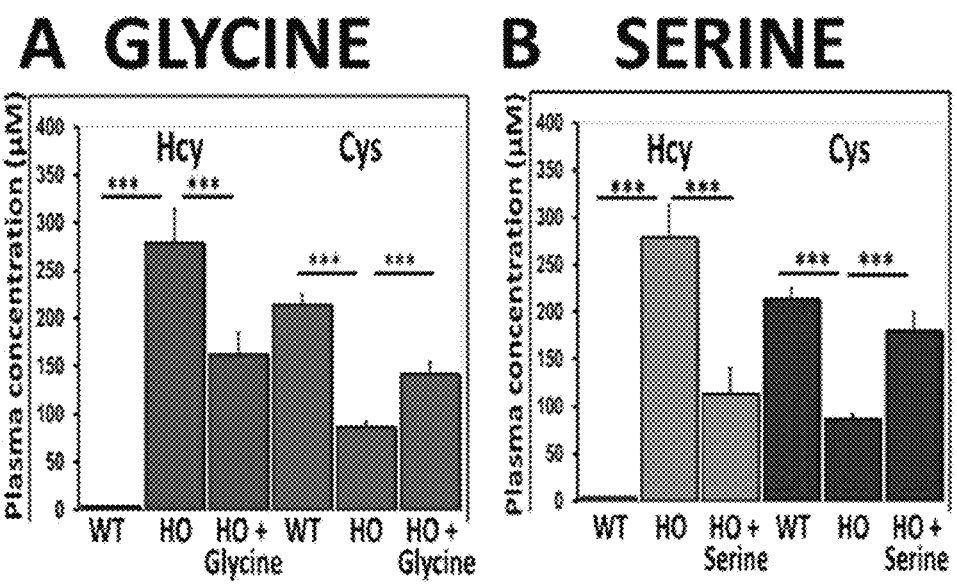
FIGS. 12A and 12B represents a histogram plot of level of homocysteine (Hcy) versus cysteine (Cys) for wild type (WT), untreated (HO) and treated (HO+glycine) (A); represents a histogram plot (B) of level of homocysteine versus cysteine for wild type (WT), untreated (HO) and treated (HO+serine) (B) of the HCU mouse model in certain embodiments disclosed herein.

In other exemplary methods, experiments were performed using the HO mouse model and administering various amino acids or amino acid derivatives to the mice and observing Hcy levels in the mice based on these treatments. It was observed that treatment with high level A. glycine or B. serine in drinking water significantly lowered plasma Hcy and increased plasma cysteine levels in HO mice in the presence of a normal methionine diet. As illustrated in FIGS. 12A and 12B, a histogram plot of level of homocysteine (Hcy) versus cysteine (Cys) for wild type (WT), untreated (HO) and treated (HO+glycine) (12A); and 12B represents a histogram plot of the level of homocysteine (Hcy) versus cysteine (Cys) for wild type (WT), untreated (HO) and treated (HO+serine) (B) of the HCU mouse model.

It is noted that WT mice (n=6) were untreated controls. HO HCU mice (N=8, 4 of each sex in each group) were either untreated or treated with about 3.0% (w/v) glycine w/v or about 3.0% (w/v) serine given in drinking water supplied ad libitum for one week. Plasma samples were taken and Hcy and cysteine levels were determined. *** denotes a P value<0.0001. Similar levels of Hcy reduction were observed with about 3.0% sarcosine (methylglycine) or about 3.0% (w/v) histidine. Therefore, these amino acid supplements can be used alone or in combination with other disclosed agents in order to treat aberrant Hcy levels in a subject such as a subject having HCU.

Surprisingly, when either of these treatments was combined with betaine treatment, no further reduction in plasma tHcy levels was observed. Collectively, these points indicate a critical role for OCM in regulating tHcy levels in HCU.

Example 8

In other exemplary methods, combinations of exemplary amino acids (e.g. glycine and serine) in combination with standard betaine treatment was examined for further lowering of Hcy using the HO mouse model representative of a human having HCU.

In accordance with these methods, HO HCU mice (N=8, 4 of each sex in each group) were treated with either about 3.0% glycine w/v or about 3.0% w/v serine given in drinking water supplied ad libitum for one week in the presence and absence of about 3.0% w/v betaine. Plasma samples were taken from the mice at various times and Hcy levels were determined. It was observed that in the presence of the amino acids, further lowering of Hcy due to betaine was reduced and/or completely prevented. It is noted that this observation for glycine and serine in combination with betaine was also observed with certain other amino acids, histidine, sarcosine/methylglycine and tryptophan treatment.

Figure 13:
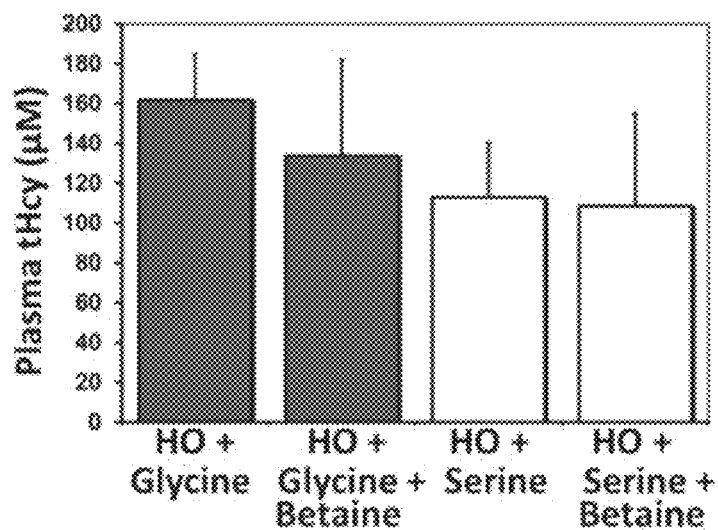
FIG. 13 represents a histogram plot of level of homocysteine versus cysteine levels for treated (HO+glycine), treated (HO+glycine+betaine); and homocysteine (Hcy) versus cysteine (Cys) for treated (HO+serine), treated (HO+serine+betaine) in certain embodiments disclosed herein.

As illustrated in FIG. 13, a histogram plot was generated to represent levels of homocysteine (Hcy) versus cysteine (Cys) levels for treated (HO+glycine), treated (HO+glycine+betaine); and homocysteine (Hcy) versus cysteine (Cys) for treated (HO+serine), treated (HO+serine+betaine) in certain embodiments disclosed herein.

It is noted that very high levels of glycine, serine and formate (e.g. 5.0% w/v concentration in drinking water) were administered over four days ad libitum (e.g., 1 ml/day, although such amounts may vary on size and potential intake of each mouse). In some implementations, a glycerol-formate (gradual release) system may be used. In some implementations, a glycerol-glucose conjugate (gradual release with improved solubility) system may be used. In some implementations, other compounds with much lower toxicity may be capable of replicating this effect.

Example 9

In another exemplary experiment, treatment of HO HCU mice with a formate agent (e.g. sodium formate) significantly lowered plasma Hcy levels. In other exemplary methods, a formate agent was combined with standard HCU treatments in order to assess whether there were additive or synergistic effects of a formate agent when combined with the standard treatment. It was observed that treatment with formate alone reduced Hcy levels in the acceptable mouse model to greater levels that the standard treatment (e.g. betaine alone as previously observed to be about 15-25% reduction) and when combined with the standard treatment near normal levels of Hcy were observed. It is noted that these experiments were performed in the presence of a normal methionine/protein diet not a methionine reduced diet. Surprisingly, synergistic effects of the combination of agents were observed in these experiments reducing Hcy to normal or near normal levels in the presence of a normal protein diet.

Figure 14:
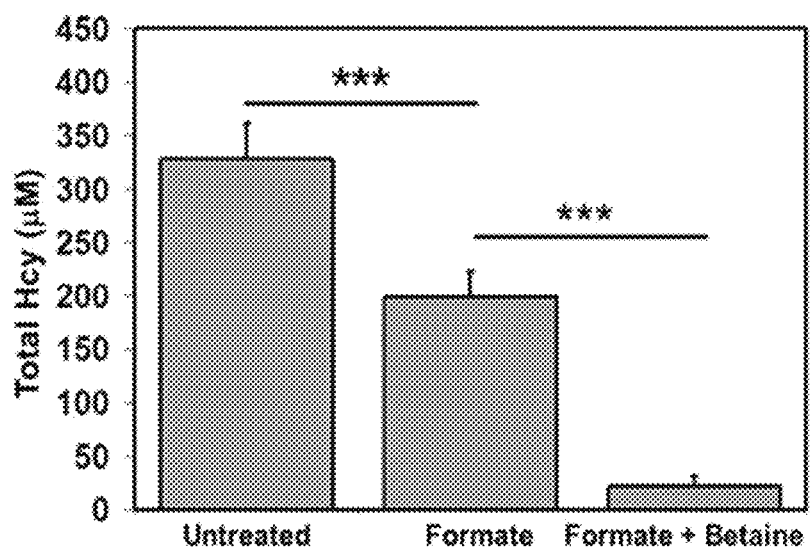
FIG. 14 represents a histogram plot of level of homocysteine levels (Hcy) untreated (HO), treated (e.g. formate agent) and treated with standard treatment combinations (e.g. formate and trimethylglycine (e.g. betaine)) using the HCU mouse model in certain embodiments disclosed herein.

As found in FIG. 14, a histogram plot illustrates level of homocysteine levels (Hcy) in untreated (HO), treated (e.g. formate agent) and treated with standard treatment combinations (e.g. formate and trimethylglycine (e.g. betaine)) using the HCU mouse model in certain embodiments disclosed herein. Plasma Hcy levels were determined from HO HCU mice (n=8 per group) in the presence and absence of either about 5.0% w/v sodium formate alone or in combination with about 3.0% betaine given in drinking water given ad libitum. Results shown are representative of 3 independent experiments. *** denotes a P value of <0.0001

Example 10

In another exemplary method, experiments were performed to measure levels of a critical enzyme in treated and untreated mouse models (HO). In these methods, a formate agent (e.g. sodium formate) was observed to restore normal expression levels of the critical enzyme, DMGDH, in HO HCU mice. In addition, when a formate agent was combined with standard treatment (e.g. betaine), response level for restoring DMGDH was surprisingly synergistic and conducive to improved lowering of homocysteine by betaine treatment.

Figures 15A, 15B:
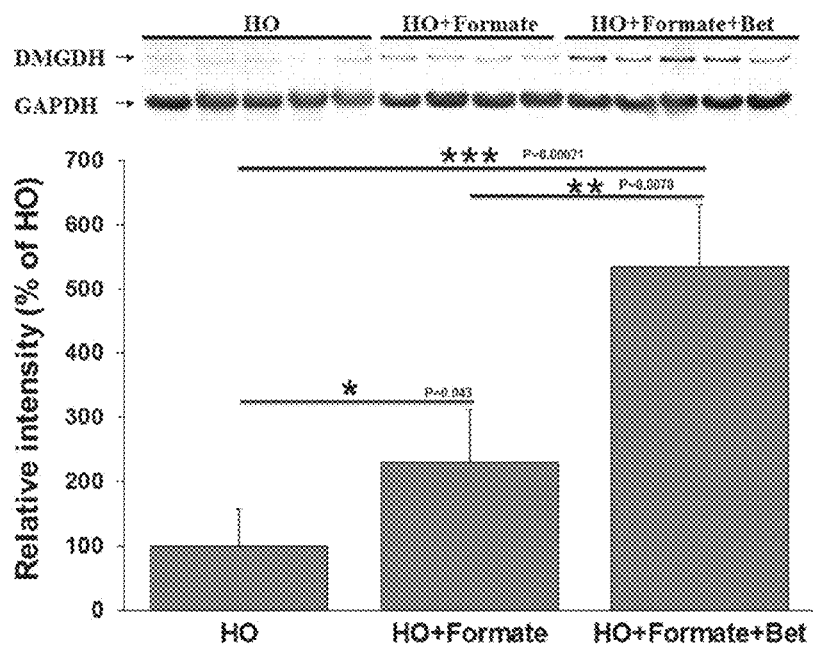
FIGS. 15A-15B represents a Western blot comparing the level of DMGDH and GAPDH (control) for untreated (HO), treated (e.g. formate agent) and treated with standard treatment combinations (e.g. formate and trimethylglycine (e.g. betaine)) using the HCU mouse model (A); and further illustrating in a histogram plot (B), level of intensity of DMDGH for untreated (HO), treated (e.g. formate agent) and treated with standard treatment combinations (e.g. formate and trimethylglycine (e.g. betaine)) using the HCU mouse model in certain embodiments disclosed herein.

As found in FIGS. 15A-15B, a Western blot comparing the level of DMGDH and GAPDH (control) for untreated (HO), treated (e.g. formate agent) and treated with standard treatment combinations (e.g. formate and trimethylglycine (e.g. betaine)) using the HCU mouse model (15A); and further illustrating in a histogram plot (15B), level of intensity of DMDGH for untreated (HO), treated (e.g. formate agent) and treated with standard treatment combinations (e.g. formate and trimethylglycine (e.g. betaine)) using the HCU mouse model in certain embodiments disclosed herein. Western blotting analysis of hepatic DMGDH protein levels in HO HCU mice in the presence and absence of either about 5.0% sodium formate alone or in combination with about 3.0% betaine given ad libitum in drinking water for about one week. N=9 per group. This figure is representative of three independent experiments.

Example 11

In another exemplary experiment, NKH as represented in the experimental mouse model, A394V mice was tested for levels of Hcy in the NKH mouse model when exposed to various agents. NKH is a rare autosomal recessively inherited glycine encephalopathy caused by a deficiency in the mitochondrial glycine cleavage system, which lead to severe clinical symptoms. Nonketotic hyperglycinemia is characterized by complex and diverse phenotypes, such as hypotonia, seizures, cognitive impairment, developmental delays and myoclonic jerks that may lead to apnea and death. For the severest forms of this disease, there is currently no effective treatment.

In this experiment, a knock-in mouse model with the clinically observed human GLDC mutation A394V engineered into the mouse gene was used. This mutation retains a small amount of residual enzyme that is sufficient to create a viable model. However, when this mouse is challenged with about 5.0% w/v glycine given in drinking water ad libitum, a massive increase in plasma Hcy was observed. Therefore, it was thought that a formate agent may be able to reduce this surge in Hcy and may further reduce Hcy in the model. Concomitant treatment with formate (about 5.0% w/v given in drinking water ad libitum) significantly reduced glycine induced increase in Hcy to near normal levels.

Exemplary FIG. 16 represents a histogram plot of level of homocysteine levels (Hcy) untreated (HO), treated: as a negative control (e.g. glycine) and treated with a negative control plus a novel treatment (e.g. formate agent) in a knock-out mouse model (e.g. GLDC mutation A394V mouse model) representing NKH (nonketotic hyperglycinemia) in certain embodiments disclosed herein. Data shown has an N=5 animals per group and is representative of 2 independent experiments.

Example 12

In an alternative experiment, agents were used to verify involvement of BHMT in the homocystinuria treatment process. In these exemplary methods, a Cbs null mouse was used where severe liver damage to the mouse model interferes with standard HCU treatments to reduce Hcy. Using the Cbs null mouse model where severe liver damage abolishes BHMT-mediated betaine response, it was observed that agents capable of reducing Hcy with and without standard treatment in the HO mouse model were unable to reduce Hcy in the Cbs null mouse model. It is noted that the tested formate agent, and amino acids, serine or glycine were unable to lower Hcy in the Cbs null mouse model. This data supports that at least part of the effect of these additional agents are BHMT dependent.

As represented in FIGS. 17A-17C, exemplary images of WT (17A), Cbs null (−/−: BHMT mouse model knock out) (17B) and HO (17C) of liver samples obtained demonstrating level of tissue damage and further demonstrating that treatment response is at least BHMT dependent.

Example 13

In another exemplary method, zinc and zinc-containing agents were examined for effects on aberrant levels of homocysteine. It is known that there are significantly higher levels of BHMT protein in the long-term betaine treatment group where BHMT mediated remethylation of Hcy is diminished, this raised the possibility that the BHMT protein is impaired in its function. Previous work demonstrated that purified BHMT requires a thiol reducing agent for activity and that prolonged exposure of BHMT to buffers lacking reducing agents results in the slow irreversible loss of its catalytic zinc molecule and a corresponding loss of activity. In this context, further induction of BHMT expression observed in the long-term betaine treatment group could constitute a not entirely successful compensatory mechanism designed to mitigate the effects of diminished BHMT activity.

BHMT is unusual in that it constitutes approximately 2% of total protein in the liver. During long-term betaine treatment this rises to up to 8-10% of total hepatic protein which is an enormous amount of protein that would require zinc for its function. Zinc cannot be stored in mammals and must be replenished by the diet. However dietary sources of zinc are typically high in protein and therefore precluded by the low methionine diet. Therefore long term betaine treatment in HCU or other homocystinurias has the potential to induce zinc deficiency and thus impair BHMT protein function and concomitantly reduce the betaine response.

In one exemplary method, mice were given zinc in drinking water. For this example, 8 HO HCU mice were provided drinking water supplemented with zinc (e.g. 0.05% w/v Zinc sulfate) given ad libitum for one week. It was observed that this treatment resulted in an average 25% decrease in plasma homocysteine (p<0.001). When this treatment was combined with betaine (data not shown), zinc supplementation prevented the previously observed decrease in betaine efficacy during long term betaine treatment.

These data indicate that zinc supplementation is a novel strategy for improving treatment outcome in HCU and conceivably other forms of homocystinuria due to remethylation disorders. The use of zinc in HCU or these other diseases has never been proposed or reported in the literature. It is also contemplated that zinc can be combined with one or more of glycine, methylglycine, serine, histidine in combination with or without formate or formate derivative (e.g. triformin etc.) in the presence or absence of betaine to treat HCU and other homocysteine aberrant conditions.

Figure 18:
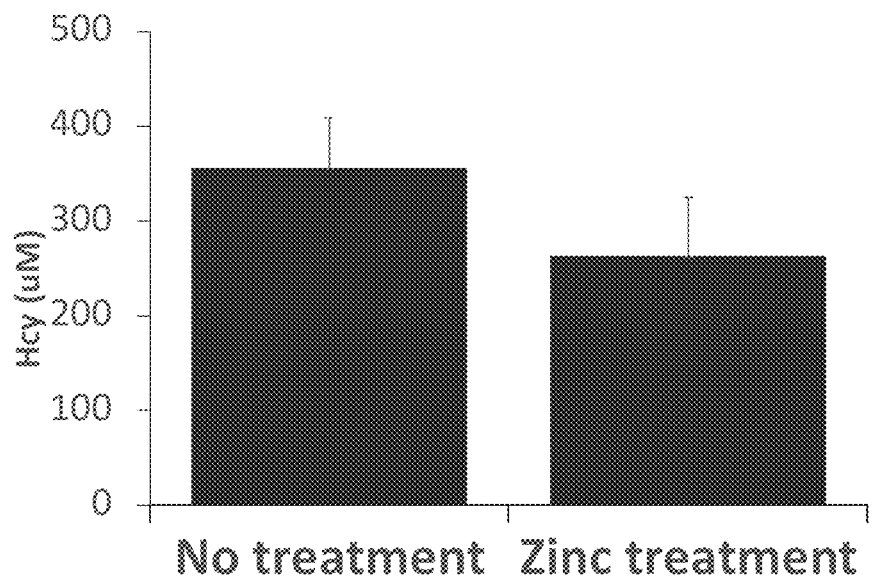
FIG. 18 represents a histogram plot of homocysteine levels (Hcy) of untreated and zinc treated HO mice and assessing level of homocysteine mouse model in certain embodiments disclosed herein.

FIG. 18 represents a histogram plot of homocysteine levels (Hcy) untreated and treated with zinc using the HCU mouse model in certain embodiments disclosed herein.

Example 14

In other exemplary methods, hepatic ADH5 expression levels were examined in untreated (WT) mice and HO HCU mice in the presence and absence of formate (e.g. 5% w/v sodium formate in drinking water given ad libitum) treatment for one week (N=8, 4 of each sex, for each group). Under normal conditions, cellular concentration of folate-binding proteins exceeds that of folate derivatives, and therefore, the concentration of free folate in the cell is negligible. The provision of a significant excess of one-carbon donor compounds such as formate, serine, or glycine has the potential to change that situation and lead to the oxidation of folate species to formaldehyde which can be genotoxic. Cells express ADH5 to guard against the accumulation of toxic levels of formaldehyde. The detoxification of formaldehyde is initiated by the natural cellular antioxidant defense afforded by glutathione, which spontaneously reacts with formaldehyde to form S-hydroxymethylglutathione. Followed by NADP+-dependent oxidation of S-hydroxymethylglutathione to S-formylglutathione is catalyzed by ADH5. S-Formylglutathione is subsequently converted by S-formylglutathione hydrolase (FGH) to formate, which is then free to enter the one-carbon cycle. In addition to the conversion from formate, formaldehyde is also formed in the reaction catalyzed by dimethylglycine dehydrogenase as part of the betaine pathway. In certain exemplary methods, to reduce any adverse effects of formaldehyde formation and accumulation, co-administration of taurine and n-acetylcysteine can be used to treat HCU or NKU or other homocystinuria aberrant conditions. In part, these additional agents are able to boost available tissue and plasma levels of glutathione and likely boost formaldehyde detoxification.

Figures 19A, 19B:
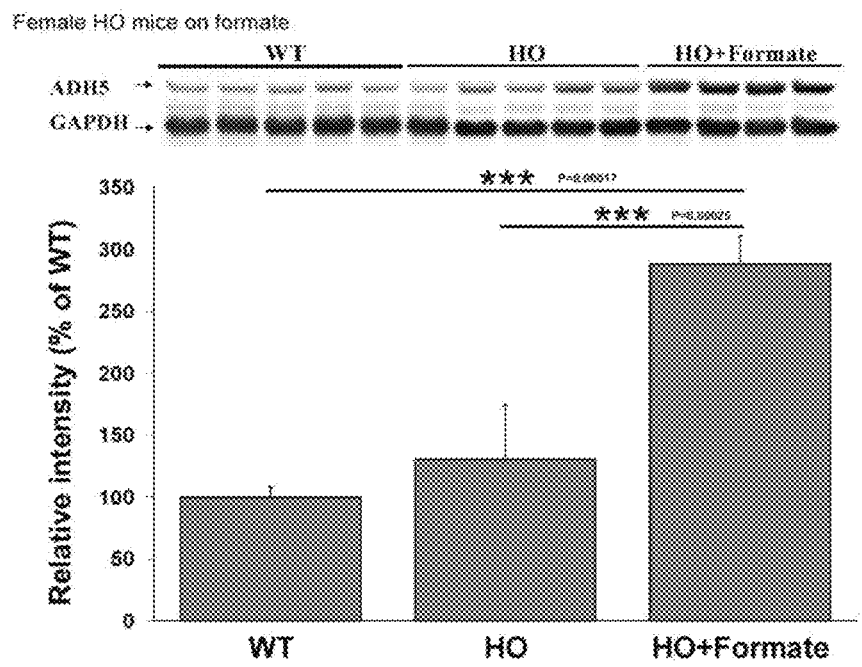
FIG. 19A-19B represents a Western blot comparing the level of ADH5 and GAPDH (control) for wild type (WT), untreated (HO), and treated (e.g. formate agent) using the HCU mouse model (A); and further illustrating in a histogram plot (B), level of intensity of ADH5 for wild type (WT), untreated (HO), and treated (e.g. formate agent) using the HCU mouse model in certain embodiments disclosed herein.

FIG. 19A-19B represents a Western blot comparing the level of ADH5 and GAPDH (control) for wild type (WT), untreated (HO), and treated (e.g. formate agent) using the HCU mouse model (A); and further illustrating in a histogram plot (B), level of intensity of ADH5 for wild type (WT), untreated (HO), and treated (e.g. formate agent) using the HCU mouse model in certain embodiments disclosed herein.

All of the COMPOSITIONS and METHODS disclosed and claimed herein may be made and executed without undue experimentation in light of the present disclosure. While the COMPOSITIONS and METHODS have been described in terms of preferred embodiments, it will be apparent to those of skill in the art that variation may be applied to the COMPOSITIONS and METHODS and in the steps or in the sequence of steps of the METHODS described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A pharmaceutical composition for administration to a subject, the composition comprising:
    one or more of formate, formate salt, formate ester, diformylglycerol or derivative thereof; diformylglycerol-glucose or derivative thereof, triformyl glycerol or derivative thereof; diformylglycerophosphocholine or derivative thereof, diformylglycerophosphoethanolamine; or derivative thereof, and a pharmaceutically acceptable excipient; and trimethylglycine or derivative thereof further comprising zinc, zinc conjugate or zinc delivery agent or combinations thereof.

2. The composition according to claim 1, wherein the formate, formate salt, diformylglycerol or derivative thereof, diformylglycerol-glucose or derivative thereof, triformyl glycerol or derivative thereof, diformylglycerophosphocholine or derivative thereof, diformylglycerophosphoethanolamine; or derivative thereof comprises about 1.0 mg/kg to about 100 mg/kg per dose.

3. The composition according to claim 1, wherein the trimethylglycine or derivative thereof comprises about 1.0 mg/kg to about 100 mg/kg per dose.

4. The composition according to claim 1, wherein the composition further comprises one or more of taurine and n-acetylcysteine.

5. A method of treating homocystinuria in a subject, the method comprising: administering an effective amount of a composition comprising, one or more of formate, formate salt, formate ester, diformylglycerol or derivative thereof; diformylglycerol-glucose or derivative thereof, triformyl glycerol or derivative thereof; diformylglycerophosphocholine or derivative thereof, diformylglycerophosphoethanolamine or; derivative thereof, and a pharmaceutically acceptable excipient, and treating homocystinuria in the subject.

6. The method according to claim 5, wherein the composition further comprises zinc, zinc conjugate or zinc delivery agent or combinations thereof.

7. The method according to claim 5, wherein administering the composition comprises administering the composition 2-4 times per day, once daily, every other day or weekly to the subject.

8. The method according to claim 5, wherein the subject is evaluated for levels of homocysteine before, during, and/or after administering the composition to assess efficacy of dosing regimens for the subject.

9. The method according to claim 5, wherein administering the composition comprises administering orally, by oral or intravenous slow-release form, subcutaneously, intravenously, intra-rectally, topically, drop-wise, or other suitable mode of administration to the subject.

10. The method according to claim 9, wherein administering the composition comprises administering orally at mealtime to the subject for one, two, three or more times daily or every other day.

11. The method according to claim 5, wherein treating homocystinuria in the subject further comprises administering at least one of serine, glycine, methylglycine (sarcosine), or histidine to the subject.

12. The method according to claim 5, wherein treating homocystinuria in the subject comprises reducing homocysteine (Hcy) in the subject by at least 10% compared to a subject having homocystinuria not treated with the composition.

13. A method of treating Nonketotic hyperglycinemia (NKH) in a subject, the method comprising: administering an effective amount of a composition comprising, one or more of formate, formate salt, formate ester, diformylglycerol or derivative thereof, diformylglycerol-glucose or derivative thereof; triformyl glycerol or derivative thereof; diformylglycerophosphocholine or derivative thereof, diformylglycerophosphoethanolamine or; derivative thereof, and a pharmaceutically acceptable excipient, and treating NKH or symptom of NKH in the subject.

14. The composition according to claim 1, wherein the composition is formate salt or diformylglycerol.

15. The composition according to claim 14, wherein the formate salt comprises about 1.0 mg/kg to about 100 mg/kg per dose.

16. The method according to claim 5, wherein administering the effective amount of the composition comprises administering formate, formate salt, or formate ester to the subject and treating homocystinuria in the subject.

17. The method according to claim 5, further comprising, administering trimethylglycine or derivative thereof to the subject.

18. The method according to claim 5, wherein the subject is already consuming trimethylglycine or derivative thereof and administering the composition prolongs trimethylglycine or derivative thereof efficacy in the subject.

19. The method according to claim 5, wherein the subject has genetic homocystinuria.

20. The method according to claim 19, wherein the genetic homocystinuria comprises HCU.

21. The method according to claim 13, wherein administering the effective amount of the composition comprises administering triformyl glycerol or derivative thereof to the subject and treating NKH or symptom of NKH in the subject.

22. The method according to claim 21, wherein the triformyl glycerol comprises about 1.0 mg/kg to about 100 mg/kg per dose.

23. A pharmaceutical composition for administration to a subject, the composition comprising:
one or more of diformylglycerol or derivative thereof; diformylglycerol-glucose or derivative thereof, triformyl glycerol or derivative thereof, diformylglycerophosphocholine or derivative thereof; diformylglycerophosphoethanolamine, or derivative thereof; and a pharmaceutically acceptable excipient, and further comprising trimethylglycine or derivative thereof.

24. The composition according to claim 23, further comprising zinc, zinc conjugate or zinc delivery agent or combinations thereof.

25. The composition according to claim 23, wherein the diformylglycerol or derivative thereof; diformylglycerol-glucose or derivative thereof; triformyl glycerol or derivative thereof, diformylglycerophosphocholine or derivative thereof, diformylglycerophosphoethanolamine; or derivative thereof comprises about 1.0 mg/kg to about 100 mg/kg per dose.

26. The composition according to claim 23, wherein the trimethylglycine or derivative thereof comprises about 1.0 mg/kg to about 100 mg/kg per dose.

27. The composition according to claim 23, wherein the composition further comprises one or more of taurine and n-acetylcysteine.

28. The composition according to claim 23, further comprising one or more of serine, glycine, methylglycine (sarcosine), or histidine.

29. The composition according to claim 23, wherein the pharmaceutical composition comprises a gradual or sustained release formulation, a tablet, a buccal patch formulation, other sublingual formulation, a gel caplet, a suspension, a bolus, a powder, granules, a paste, an intravenous formulation, an intramuscular formulation, an epidural formulation, a subcutaneous formulation or other internally administered systemic absorption formulation.

* * * * *